United States Patent
Tanizawa et al.

(10) Patent No.: US 10,291,590 B2
(45) Date of Patent: May 14, 2019

(54) COMMUNICATION SYSTEM, COMMUNICATION APPARATUS, COMMUNICATION METHOD, AND COMPUTER PROGRAM PRODUCT

(71) Applicant: Kabushiki Kaisha Toshiba, Minato-ku (JP)

(72) Inventors: Yoshimichi Tanizawa, Yokohama (JP); Hideaki Sato, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/641,697

(22) Filed: Mar. 9, 2015

(65) Prior Publication Data
US 2015/0271147 A1 Sep. 24, 2015

(30) Foreign Application Priority Data
Mar. 19, 2014 (JP) ................. 2014-056921

(51) Int. Cl.
*H04L 29/06* (2006.01)
*H04L 9/06* (2006.01)
*H04L 9/08* (2006.01)

(52) U.S. Cl.
CPC ........ *H04L 63/0428* (2013.01); *H04L 9/0656* (2013.01); *H04L 9/0852* (2013.01); *H04L 63/061* (2013.01)

(58) Field of Classification Search
CPC ......... G06F 15/16; H04L 9/14; H04L 63/061; H04L 63/0428; H04L 63/0435;
(Continued)

(56) References Cited

U.S. PATENT DOCUMENTS 5,703,948 A * 12/1997 Yanovsky ................. H04L 9/16
380/262
5,805,705 A * 9/1998 Gray ......................... H04L 9/12
380/260
(Continued)

FOREIGN PATENT DOCUMENTS

JP 2005-117511 A 4/2005
JP 2005-217676 A 8/2005
(Continued)

OTHER PUBLICATIONS

Mink et al., A Quantum Network Manager That Supports a One-Time Pad Stream.*
(Continued)

*Primary Examiner* — Hadi S Armouche
*Assistant Examiner* — Huan V Doan
(74) *Attorney, Agent, or Firm* — Oblon, McClelland, Maier & Neustadt, L.L.P.

(57) ABSTRACT

According to an embodiment, a communication system includes a plurality of communication apparatuses. Each of the communication apparatuses includes a key generator and a synchronization processor. The key generator generates shared keys shared with another communication apparatus. The synchronization processor synchronizes at least one of order of using the generated shared keys and roles played when the generated shared keys are used, with another communication apparatus based on a rule determined in advance.

13 Claims, 17 Drawing Sheets

(58) Field of Classification Search
CPC ... H04L 63/067; H04L 9/0852; H04L 9/0855; H04L 9/0858; H04L 63/062; H04L 63/065; H04L 9/0656
See application file for complete search history.

(56) References Cited

U.S. PATENT DOCUMENTS

| | | | |
|---|---|---|---|
| 7,734,757 B2 | 6/2010 | Maeda et al. | |
| 8,897,449 B1* | 11/2014 | Broadbent | H04L 9/0891 380/277 |
| 2005/0078826 A1* | 4/2005 | Takeuchi | H04L 63/0435 380/255 |
| 2008/0013738 A1* | 1/2008 | Tajima | H04L 9/0852 380/278 |
| 2008/0147820 A1* | 6/2008 | Maeda | H04L 9/0858 709/213 |
| 2009/0262942 A1* | 10/2009 | Maeda | H04L 9/0855 380/278 |
| 2013/0051559 A1* | 2/2013 | Baba | H04L 63/062 380/279 |
| 2013/0083926 A1* | 4/2013 | Hughes | H04L 9/0836 380/278 |
| 2013/0142328 A1* | 6/2013 | Shibata | H04L 9/0656 380/28 |
| 2014/0086412 A1* | 3/2014 | Shibata | H04L 9/0656 380/255 |
| 2014/0331050 A1* | 11/2014 | Armstrong | H04L 9/0855 713/171 |
| 2015/0270963 A1 | 9/2015 | Tanizawa | |

FOREIGN PATENT DOCUMENTS

| | | |
|---|---|---|
| JP | 2007-53591 A | 3/2007 |
| JP | 2007-258850 A | 10/2007 |
| JP | 2008-154019 A | 7/2008 |
| JP | 5424008 B2 | 12/2013 |
| JP | 2015-179974 A | 10/2015 |
| WO | 2012-137513 A1 | 11/2012 |
| WO | 2013-014734 A1 | 1/2013 |

OTHER PUBLICATIONS

Mink et al, High Speed Quantum Key Distribution System Supports One-Time Pad Encryption of Real-Time Video, Apr. 2006, 7 pages.*
Perrig et al., ELK a New Protocol for Efficient Large-Group Key Distribution, IEEE, (Year: 2001).*
Mink et al., A Quantum Network Manager That Supports a One-Time Pad Stream, NIST, 6 pages (Year: 2008).*
Mink et al., A Quantum Network Manager That Supports a One-Time Pad Stream, 6 pages (Year: 2008).*
O. Maurhart, "Chapter 8 QKD Networks Based on Q3P" Lect. Notes Phys., vol. 797, 2010, pp. 151-171.

* cited by examiner

COMMUNICATION SYSTEM, COMMUNICATION APPARATUS, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2014-056921, filed on Mar. 19, 2014; the entire contents of which are incorporated herein by reference.

FIELD

Embodiments described herein relate generally to a communication system, a communication apparatus, a communication method, and a computer program product.

BACKGROUND

Quantum key distribution (QKD) technology is a technique for safely sharing keys for encrypted data communication, between a transmitting node (Alice) that continuously transmits single photons and a receiving node (Bob) that receives the single photons, which are connected to each other by an optical fiber. Note that to share a key an exchange of control data through a classical channel which is called key distillation is performed between the transmitting node and the receiving node. The key as used herein is shared information to be shared between the transmitting node and the receiving node, and is a series of random numbers made up of digital data. The transmitting node (Alice) and the receiving node (Bob) are collectively referred to as nodes. It is guaranteed based on the principles of quantum mechanics that the keys shared here are not eavesdropped on.

As a protocol for system control of a quantum key distribution system, Q3P (Quantum Point to Point Protocol) is known. A LOAD subprotocol of Q3P is a protocol that stores a key generated and stored by quantum key distribution in a single storage area called a "Common Store" and determines information as to whether the key is used as an encryption key or a decryption key, between the nodes, as necessary.

However, conventional art has problems such as an increase in processing load and wasted key consumption. For example, every time a key is generated, a process such as the LOAD subprotocol needs to be performed, complicating the system configuration. In addition, the time for a key to be finally able to be used increases. In addition, extra keys are consumed to safely execute the protocol.

DETAILED DESCRIPTION

According to an embodiment, a communication system includes a plurality of communication apparatuses. Each of the communication apparatuses includes a key generator and a synchronization processor. The key generator generates shared keys shared with another communication apparatus. The synchronization processor synchronizes at least one of order of using the generated shared keys and roles played when the generated shared keys are used, with another communication apparatus based on a rule determined in advance.

Various embodiments will be described in detail below with reference to the accompanying drawings.

First Embodiment

Figure 1:
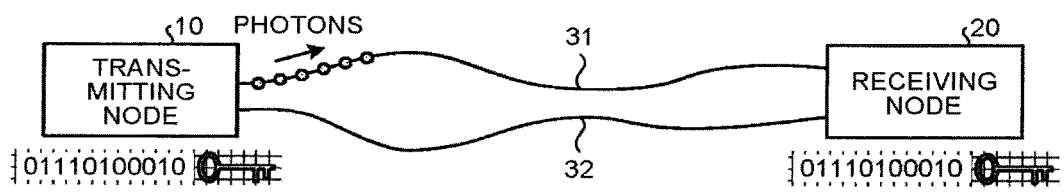
FIG. 1 is a diagram illustrating an example of a configuration of a quantum key distribution system.

FIG. 1 is a diagram illustrating an example of a configuration of a quantum key distribution system. The quantum key distribution system is configured such that a transmitting node 10 and a receiving node 20 are connected to each other by channels 31 and 32. The channel 31 is a quantum channel that transmits and receives photons. The channel 32 is a classical channel for exchanging control data.

It is guaranteed by information theory that, when encrypted data communication is performed using a key shared by quantum key distribution technology and using an encryption communication scheme called a one-time pad, encrypted data transmitted here cannot be cracked by any eavesdropper having all kinds of knowledge.

The one-time pad is a scheme in which encryption and decryption are performed using a key of the same length as data to be transmitted and received, and the key used once is discarded without being used thereafter. A key used as an encryption key by one node needs to be used as a decryption key by the other node. Performing of both of encrypted data transmission from the transmitting node 10 to the receiving node 20 and encrypted data transmission from the receiving node 20 to the transmitting node 10, i.e., full-duplex encrypted data communication, is considered. In this case, the entire system needs to be controlled such that, of keys shared between the nodes, a key used as an encryption key by one node is used as a decryption key by the other node, and a key used as a decryption key by one node is used as an encryption key by the other node. This control is also hereinafter referred to as key synchronization (key allocation) of an encryption key and a decryption key.

Figure 2:
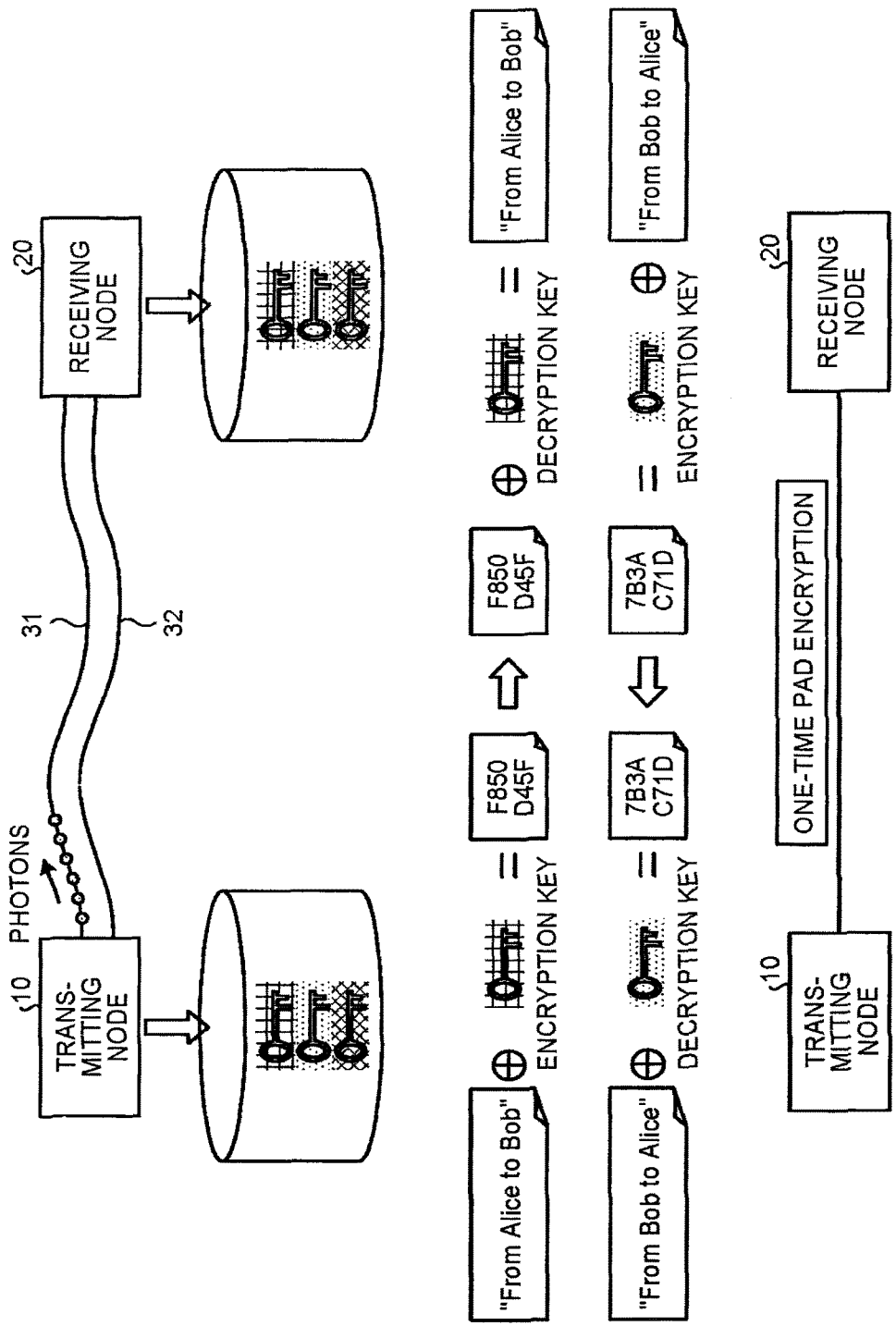
FIG. 2 is a diagram describing an example of key synchronization (key allocation)

FIG. 2 is a diagram describing an example of key synchronization (key allocation). The transmitting node 10 encrypts the data "From Alice to Bob" with an encryption key and transmits the encrypted data to the receiving node 20. In this case, the receiving node 20 decrypts the received data with a decryption key associated with the encryption key. Likewise, the receiving node 20 encrypts the data "From Bob to Alice" with another encryption key and transmits the encrypted data to the transmitting node 10. In this case, the transmitting node 10 decrypts the received data with a decryption key associated with this another encryption key.

As described above, as a protocol for control of key synchronization, Q3P is known. It is determined by the LOAD subprotocol of Q3P whether a key is used as an encryption key or a decryption key.

Figure 3:
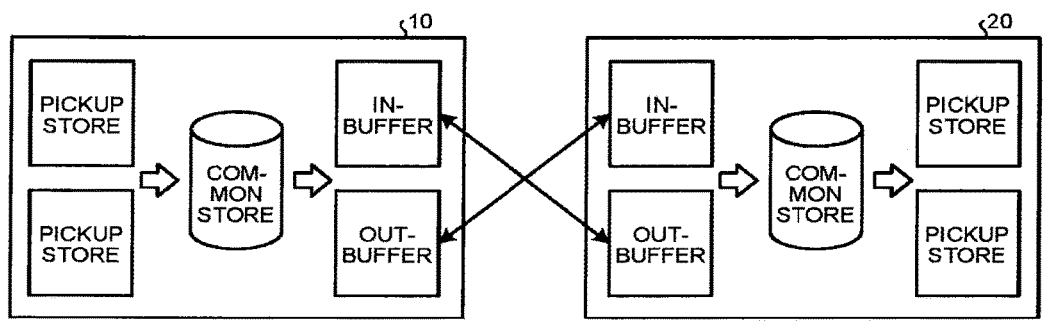
FIG. 3 is a diagram illustrating an exemplary configuration of key storage areas of Q3P.

The LOAD subprotocol of Q3P will be described below. FIG. 3 is a diagram illustrating an exemplary configuration of key storage areas of Q3P.

For nodes to be connected, one is set as a master and the other is set as a slave in advance. Each node includes Pickup Stores, a Common Store, an Out-Buffer, and an In-Buffer. Each Pickup Store is an area that stores keys generated by quantum key distribution. The Common Store is an area that stores keys transferred from the Pickup Stores. The Out-Buffer is a storage area that stores keys used as encryption keys. The In-Buffer is a storage area that stores keys used as decryption keys.

The keys stored in the Out-Buffer in one node should be stored in the In-Buffer in the other node. In addition, the keys stored in the In-Buffer in one node should be stored in the Out-Buffer in the other node. When an upper layer application encrypts and transmits data, the upper layer application takes an encryption key out of the Out-Buffer and uses the encryption key. The encryption key used is deleted from the Out-Buffer. In addition, when the upper layer application receives and decrypts data, the upper layer application takes a decryption key out of the In-Buffer and uses the decryption key. The decryption key used is deleted from the In-Buffer.

The node monitors the In-Buffer thereof. When the number of decryption keys stored in the In-Buffer decreases, the node uses keys stored in the Common Store, as decryption keys thereof (supplements decryption keys). In addition, a node at the other end performs control to use identical keys stored in the Common Store as encryption keys (to supplement encryption keys). A protocol used at this time is the LOAD subprotocol. The LOAD subprotocol is controlled by the master.

When the master node supplements a decryption key, the master node transmits to the slave node a protocol message including information (key ID) corresponding to key identification information, key size, and authentication information. The slave node having received the protocol message stores a specified key as an encryption key in the In-Buffer and transmits a response protocol message including authentication information. The master node having received the response protocol message stores a key specified by the key ID as a decryption key in the Out-Buffer.

On the other hand, when the slave node supplements a decryption key, the slave node transmits to the master node a LOAD subprotocol request message including the size of a required key and authentication information. The master node having received the message executes the LOAD subprotocol.

In this manner, key allocation of the quantum key distribution system (i.e., key synchronization (key allocation) of an encryption key and a decryption key) is enabled by Q3P. In FIG. 3, an arrow directed from the Common Store of each node to the In-Buffer and the Out-Buffer corresponds to a key synchronization (key allocation) process.

Figure 4:
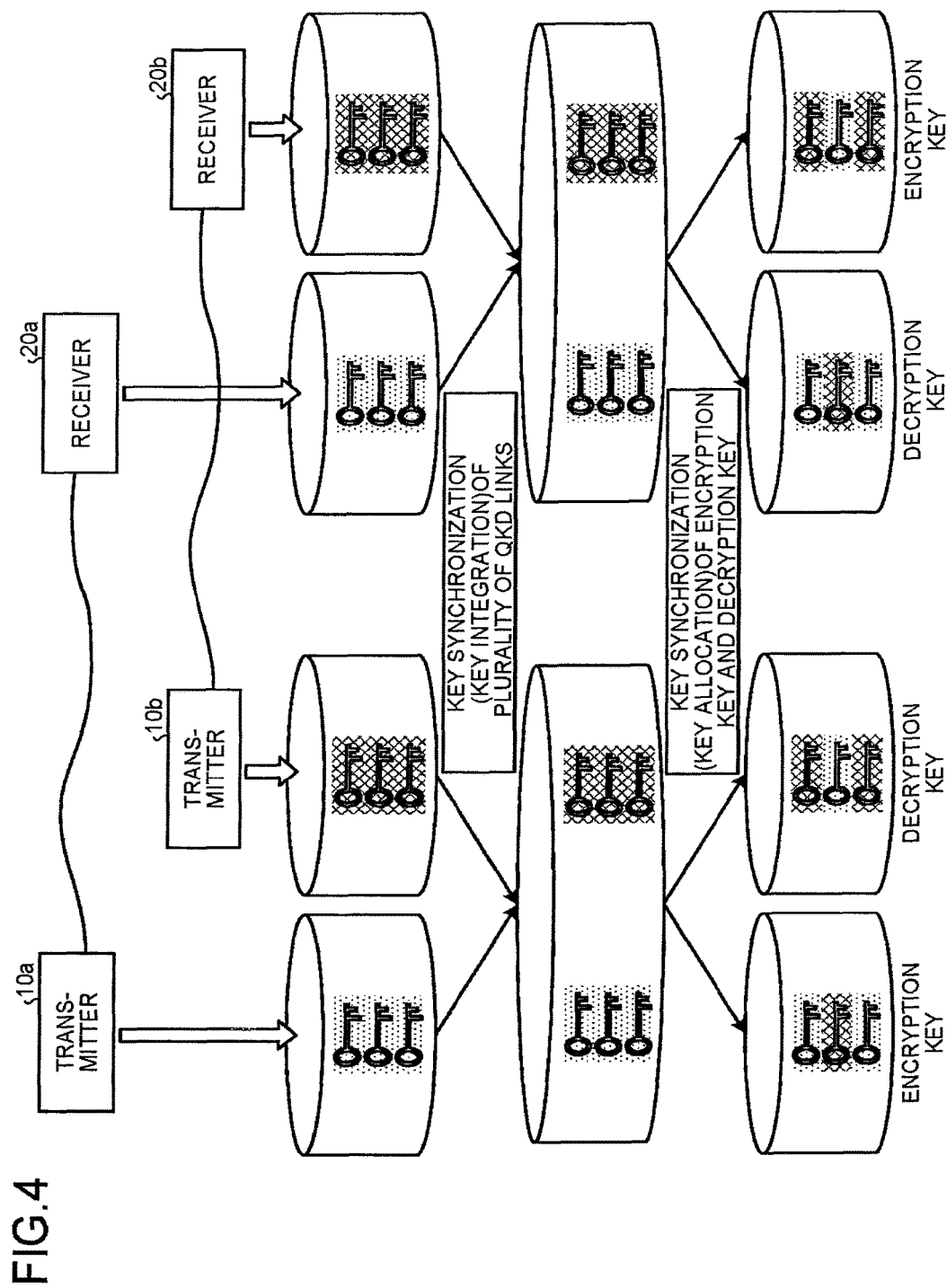
FIG. 4 is a diagram illustrating an example of key synchronization.

Q3P also considers key synchronization of a system in which more keys are shared using a plurality of quantum key distribution apparatuses. FIG. 4 is a diagram illustrating an example of key synchronization of such a system.

As illustrated in FIG. 4, for example, a transmitting node has two quantum key distribution apparatuses having a transmitting node function (a transmitter 10a and a transmitter 10b). In addition, a receiving node has two quantum key distribution apparatuses having a receiving node function (a receiver 20a and a receiver 20b). This enables to simultaneously use keys generated by quantum key distribution performed by the transmitter 10a and the receiver 20a and keys generated by quantum key distribution performed by the transmitter 10b and the receiver 20b. Namely, a double number of keys at a double speed can be used.

The transmitting node side and the receiving node side need to agree on in what order two keys are used. Control required therefor is also hereinafter referred to as key synchronization (key integration) of a plurality of QKD links.

As a protocol for system control of the key synchronization (key integration) of a plurality of QKD links, Q3P uses a STORE subprotocol. The STORE subprotocol is a protocol that stores keys generated and stored by quantum key distribution in each Pickup Store and determines which key is to be transferred to the Common Store, between the nodes, as necessary. The STORE subprotocol of Q3P will be described below.

The master node notifies the slave node of a message including at least a Pickup Store number and key ID information. When the slave receives the message, the slave likewise transmits, as a response, a message including at least a Pickup Store number and key ID information. The master receives the message and transmits an "acknowledge" message as a response. By the above-described procedure, a key specified by the key ID is transferred to the Common Store from a Pickup Store specified by the number.

In this manner, in the quantum key distribution system, key integration for the case of using a plurality of quantum key distribution apparatuses (i.e., key synchronization (key integration) of a plurality of QKD links) is enabled by Q3P.

Note that, needless to say, in the case of only one pair of a quantum key distribution apparatus included in the transmitting node and a quantum key distribution apparatus included in the receiving node (the example of FIG. 5, etc.), execution of the STORE subprotocol (i.e., key synchronization (key integration) of a plurality of QKD links) is not required and only the LOAD subprotocol is required. Namely, the Pickup Stores may be considered as the Common Store.

The above-described general key synchronization (key allocation and key integration) technique using Q3P has problems such as those explained below. One problem is that, since the protocols need to be executed every time a key is generated, the system configuration becomes complicated and the number of procedural steps increases, taking a long time to obtain an encryption key and a decryption key which are required to perform final encrypted data communication.

The speed at which keys can be used (key generation rate) is an important metric to determine the throughput of data communication in a system that performs encrypted data communication using the one-time pad. Hence, any cause that reduces the key generation rate is undesirable.

Another problem is that, though also related to the above, in order to safely execute the protocols, there is a need to at least detect or avoid the fraud or tampering of protocol data, and to do so, there is a need to add authentication information for data soundness authentication to protocol data. Hence, when the protocols are executed, extra "keys" are consumed. Therefore, consumption of keys that are not used for encrypted data communication by the application occurs and thus there is a problem in terms of effective use of keys.

In view of this, a communication apparatus according to a first embodiment implements an efficiently operating key allocation method with less processing load and less wasted key consumption which is suitable for a high-speed quantum key distribution system.

Figure 5:
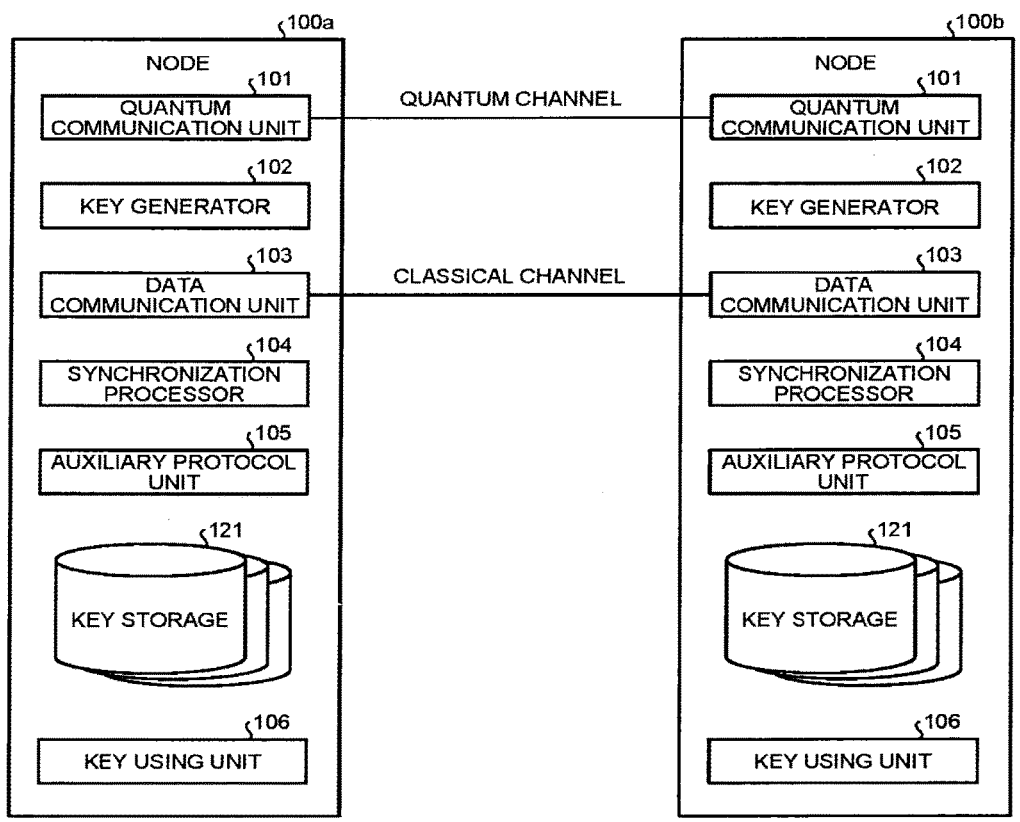
FIG. 5 is a block diagram of a communication system of a first embodiment.

FIG. 5 is a block diagram illustrating an exemplary configuration of a communication system (quantum key distribution system) of the first embodiment. Here, the components for the case of a pair of quantum key distribution apparatuses, i.e., the case of requiring only key synchronization (key allocation) of an encryption key and a decryption key of the quantum key distribution system, will be described.

Nodes 100a and 100b are apparatuses (communication apparatuses) that share keys. Two (a pair of) nodes 100a and 100b are present in one quantum key distribution system and secretly share keys by quantum key distribution technology. When the nodes 100a and 100b do not need to be distinguished from each other, they are simply referred to as the nodes 100. Each node 100 includes a quantum communication unit 101, a key generator 102, a data communication unit 103, a synchronization processor 104, an auxiliary protocol unit 105, a key storage 121, and a key using unit 106.

The key storage 121 is a storage that stores keys. At least one of the above-described Pickup Stores, Common Store, Out-Buffer, and In-Buffer may be included in the key storage 121.

A quantum channel is a channel that directly connects the nodes 100, and is used by one node 100 (which may be referred to as a transmitting node) to transmit a sequence of single photons to the other node 100 (which may be referred to as a receiving node). In the following, the node 100 on the transmitting side may be referred to as the transmitting node and the node 100 on the receiving side may be referred to as the receiving node. For the quantum channel, various communication media can be used. For example, an optical fiber can be used.

The quantum communication unit 101 connects the nodes 100 through the quantum channel. The quantum communication unit 101, for example, transmits and receives photons to/from another node 100 (external apparatus) connected thereto through the quantum channel. The transmitting node continuously transmits single photons and the receiving node continuously receives the single photons. Note that the quantum communication unit 101 controls the output intensity, timing, polarization, phase, etc., of photons which are required to implement quantum key distribution technology. Furthermore, it is assumed that the quantum communication unit 101 includes an optical apparatus required for transmission and reception (detection) of single photons.

A classical channel is a channel for performing digital data communication between the nodes 100. For the classical channel, various communication media used for the Internet, etc., can be used. Data exchanged on the classical channel has the risk of eavesdropping and fraud. To avoid this, data encryption and authentication are required.

The key generator 102 performs processing required to generate and share a key (shared key) between the nodes 100, based on the transmission and reception results of single photons performed by the quantum communication unit 101. The processes required therefor are processes called shifting, error correction, and secrecy enhancement in quantum key distribution technology. In each process, control data needs to be transmitted and received between the nodes 100 through the classical channel. (Some of) the processes performed here may be called a key distillation process.

The key (shared key) generated by the key generator 102 may be stored in the key storage 121 which will be described later or may be passed to the synchronization processor 104. The transmission and reception of control data by the key generator 102 require authentication to avoid fraud on the classical channel. In addition, encryption may be performed on the control data. The authentication and encryption of the control data are performed by the data communication unit 103 using a key stored in the key storage 121.

The data communication unit 103 connects the nodes 100 through the classical channel. The data communication unit 103 is used, for example, when control data which is required for the key generator 102 to perform a process for generating a key is exchanged between the nodes 100. For these communications, encryption and authentication can be performed using a key stored in the key storage 121.

Note that, considering the procedure of generating the first key, at a stage where a key is not yet generated, keys are required for transmission and reception of control data by the key generator 102. Hence, for example, shared information (random number information, etc.) that can be used as a key may be stored in advance in the key storage 121, and encryption and authentication of control data may be performed using the shared information. In addition, at the start-up of the system, for connection authentication of a node 100, authentication of a node 100 which is a connection destination (verification as to whether the node 100 which is the connection destination is valid) may be performed using shared information which is stored in advance likewise.

The data communication unit 103 is also used when the key using unit 106 performs encrypted data communication. In this case, too, encryption and authentication are performed using a key stored in the key storage 121. The data communication unit 103 is further used for an exchange of a protocol by the auxiliary protocol unit 105 which will be described later. For this traffic, too, encryption and authentication using a key stored in the key storage 121 may be used.

The synchronization processor 104 performs, based on a rule determined in advance, a synchronization process (the above-described key synchronization (key allocation) of an encryption key and a decryption key) for synchronizing roles played when a generated key is used, with another communication apparatus. The key allocation is the process of associating keys which are generated by the key generator 102 and result in being stored in the key storage 121, as encryption keys and decryption keys used for an exchange of control data by the key generator 102, encrypted data communication by the key using unit 106, traffic by the auxiliary protocol unit 105, and the like.

The key allocation is a process in which a key identified by a given key ID which is associated as an encryption key in one node 100 is associated as a decryption key in the other node 100 (key synchronization (key allocation) of an encryption key and a decryption key). Timing at which the synchronization processor 104 performs key allocation has variations such as the following (A1), (A2), and (A3). Any of these methods may be applied. Specific operation of the synchronization processor 104 will be described later.

(A1) A method in which a generated key is received from the key generator 102 and an association is established for the key and then the key is stored in the key storage 121

(A2) A method in which associations are established for keys already stored in the key storage 121

(A3) A method in which an association is established when the key using unit 106 obtains a key from the key storage 121

The auxiliary protocol unit 105 is used to perform key allocation by the synchronization processor 104. A configuration that does not include the auxiliary protocol unit 105 may also be employed. The auxiliary protocol unit 105 may exchange traffic through the data communication unit 103. In addition, the traffic at this time may be authenticated and may be encrypted. Specific operation of the auxiliary protocol unit 105 will be described later.

The key storage 121 stores keys generated by the key generator 102. The keys are stored in association with key IDs. In addition, the key storage 121 may store keys other than the keys generated by the key generator 102, for connection authentication at the start-up of the system, control data authentication for generation of the first key, and the like. In addition, the key storage 121 can associate keys with roles including at least an "encryption key" and a "decryption key". The roles that can be associated with keys are not limited thereto. For example, there may be an "authentication key" which is used only for data authentication and a "connection authentication key" which is used for connection authentication of a node 100. Note that an association method has variations such as the following (B1), (B2), and (B3). Any of these methods may be applied.

(B1) A method in which a correspondence table between individual keys or key IDs and role information is created (B2) A method in which different storage areas (buffers, etc.) are prepared for different roles, and keys or key IDs are stored in the storage areas (B3) A method in which computations (calculation formulas, calculation rules, etc.) by which key IDs to be associated can be calculated are determined for each role These associations are established by the synchronization processor 104.

The key using unit 106 performs encrypted data communication on the classical channel through the data communication unit 103, using a key stored in the key storage 121. The key using unit 106 may be considered as an application of the quantum key distribution system. The key using unit 106 uses a key associated as an encryption key when encrypting and transmitting data, and uses a key associated as a decryption key when receiving and decrypting encrypted data.

The quantum communication unit 101, the key generator 102, the data communication unit 103, the synchronization processor 104, the auxiliary protocol unit 105, and the key using unit 106 may be implemented, for example, by allowing a processing apparatus such as a CPU (Central Processing Unit) to execute a program, i.e., by software, or may be implemented by hardware such as an IC (Integrated Circuit), or may be implemented by using both software and hardware. In addition, a part of the quantum communication unit 101 may be implemented by an optical circuit apparatus to implement transmission and reception of photons.

The key storage 121 can be composed of various generally used storage media such as an HDD (Hard Disk Drive), an optical disk, a memory card, and a RAM (Random Access Memory).

Figure 6:
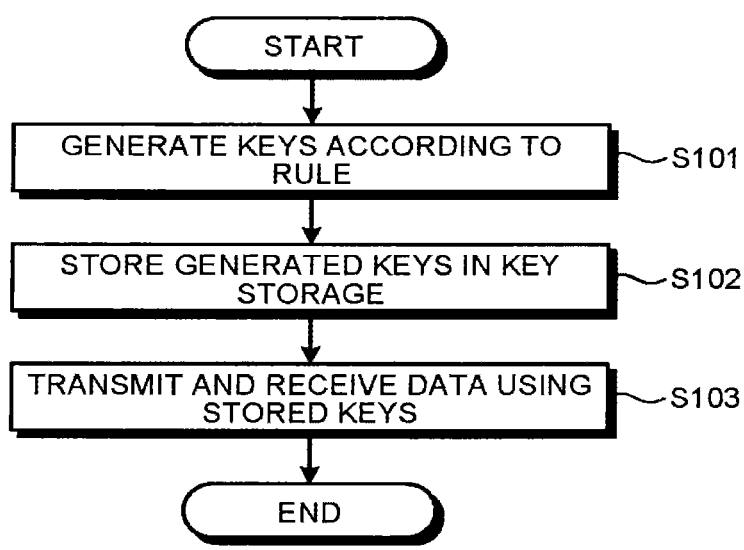
FIG. 6 is a flowchart of a communication process of the first embodiment.

Next, a communication process performed by a node 100 according to the first embodiment configured in the above-described manner will be described using FIG. 6. FIG. 6 is a flowchart illustrating an example of a communication process of the first embodiment.

The key generator 102 of the node 100 generates keys according to a rule determined in advance (step S101). The key generator 102 stores the generated keys in the key storage 121 (step S102). The key using unit 106 transmits and receives data using the stored keys (step S103). The keys used are allocated by the synchronization processor 104 by the methods explained in the above (A1) to (A3).

Variations of a key allocation method performed by the synchronization processor 104 will be described below.

First, the key generator 102 stores a generated key as it is together with a key ID in the key storage 121. The synchronization processor 104 functions when the key using unit 106 uses a key. When the key using unit 106 requires an encryption key, the synchronization processor 104 provides a key associated as an encryption key. When the key using unit 106 requires a decryption key, the synchronization processor 104 provides a key associated as a decryption key. This key allocation method corresponds to the above-described variation (A3). It is also possible to establish associations in advance as in the variations (A1) and (A2).

The synchronization processor 104, for example, treats keys with even-numbered key IDs in association with encryption keys, and treats keys with odd-numbered key IDs in association with decryption keys. Of course, the synchronization processor 104 of the other node 100 which is a communication counterpart of the node 100 having the synchronization processor 104 operating in the above-described manner establishes associations in a reverse procedure to that described above. Specifically, the synchronization processor 104 of the other node 100 treats keys with even-numbered key IDs in association with decryption keys, and treats keys with odd-numbered key IDE in association with encryption keys.

Figure 7:
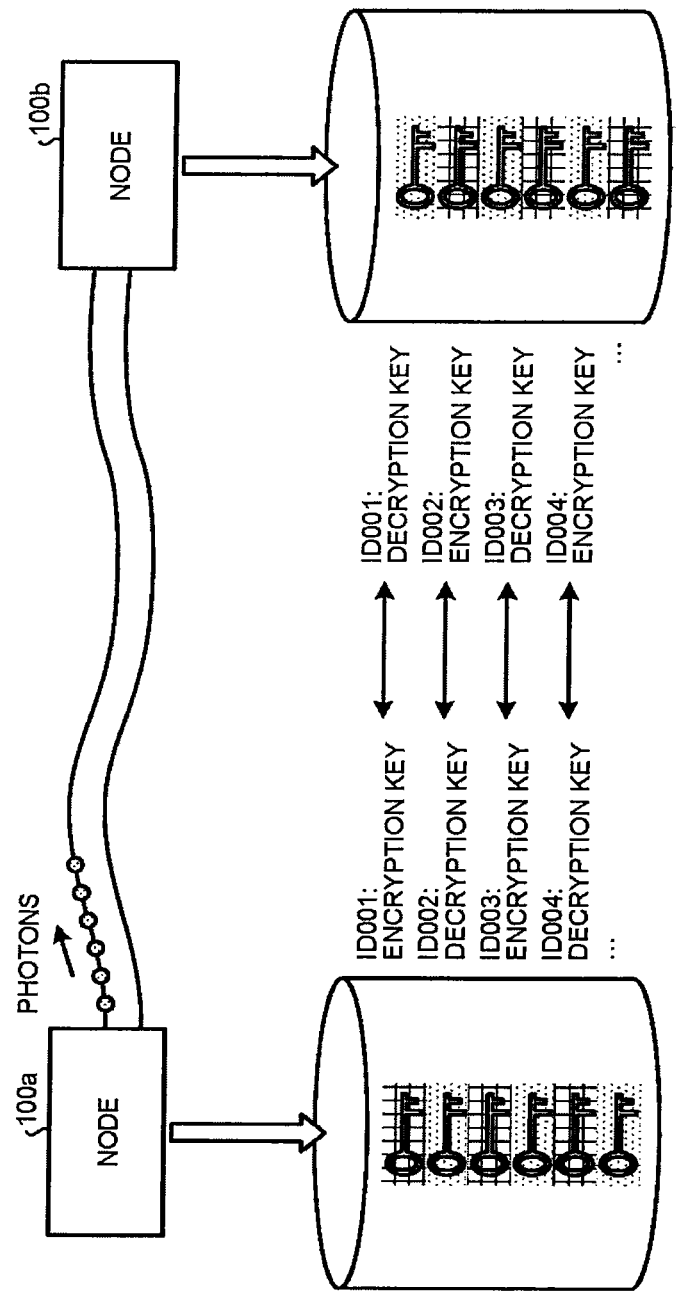
FIG. 7 is a diagram describing a specific example of a key allocation process of the first embodiment.

FIG. 7 is a diagram describing a specific example of a key allocation process of the first embodiment. The node 100a (corresponding to the "other node 100" in the above-described example) allocates the keys "ID001" and "ID003" with odd-numbered key IDs, as encryption keys (associates the keys as encryption keys). Then, the node 100a allocates the keys "ID002" and "ID004" with even-numbered key IDs, as decryption keys. Reversely, the node 100b allocates the keys "ID001" and "ID003" with odd-numbered key IDs, as decryption keys. Then, the node 100b allocates the keys "ID002" and "ID004" with even-numbered key IDs, as encryption keys.

As such, in the present embodiment, the synchronization processor 104 determines in advance an association rule with key IDs. By this, the synchronization processor 104 can perform high-speed key allocation without performing a complex protocol process, e.g., Q3P, and furthermore, without additional key consumption for the execution of a protocol.

Note that, for the "association rule with key IDs" determined in advance, various schemes are considered other than using the relationship between the even and odd numbers of key IDs.

For example, a scheme is also possible in which the remainder obtained by dividing a key ID by a specific number which is agreed in advance between the nodes 100 is referred to, and according to the value of the remainder, one node 100 associates a key indicated by the key ID as an encryption key, and the other node 100 associates a key indicated by the key ID as a decryption key.

In addition, as an extreme example, it is also possible that one node 100 associates all keys as encryption keys, and the other node 100 associates all keys as decryption keys.

In addition, the association target is not limited to key IDs and, for example, a method in which associations are established with key generation times is also possible. For example, it is also possible that keys generated during a period from a given time Y to a time Y are associated as encryption keys in one node 100 and associated as decryption keys in the other node 100, and keys generated during a period from the time Y to a time Z are associated as decryption keys in one node 100 and associated as encryption keys in the other node 100.

The example described here is the variation (B3), but at the same time, associations such as the variation (B1) and the variation (B2) may be established.

Note, however, that such simple key allocation rules may not be able to deal with shortages or imbalance between keys for each role occurring during the execution of the system. For example, it is assumed that a "rule" is adopted in which encryption keys and decryption keys are associated with each other by the relationship between the even and odd numbers of key IDs. Then, it is assumed that one node 100 performs transmission of a large amount of data but does not perform reception much, i.e., transmits a large amount of data in one direction. Such a case invites a situation where, although a large number of encryption keys of the node 100 are consumed, decryption keys are not consumed almost at all.

As a result, although keys associated as decryption keys are left, since there are no keys associated as encryption keys, encrypted data communication cannot be performed. Namely, when the "rule" is adopted in which encryption keys and decryption keys are associated with each other by the relationship between the even and odd numbers of key IDs, if a large amount of data is transmitted in one direction, with respect to the key generation speed of the key generator 102, only one-half of the keys can be effectively used.

As a method of overcoming this problem, there are the following methods (C1) and (C2).

(C1) A method in which the key storage 121 adopts a complicated rule in which taking into account the remaining numbers of keys for each role, a change is made (C2) A method in which control is performed such that, when a predetermined condition is satisfied, an auxiliary protocol is executed to resolve an imbalance between the remaining numbers of keys for each role First, the method (C1) will be described. Here, the description of the "rule" is more complicated than that of the above-described example. In the method (C1), for example, when the difference between the remaining numbers of encryption keys and decryption keys exceeds a given threshold value agreed in advance and accordingly the number of encryption keys is smaller, the ratio between the keys associated as encryption keys and the keys associated as decryption keys is changed such that the number of keys associated as encryption keys is larger, and when the number of decryption keys is smaller, the ratio is changed such that the number of keys associated as decryption keys is larger.

Figure 8:
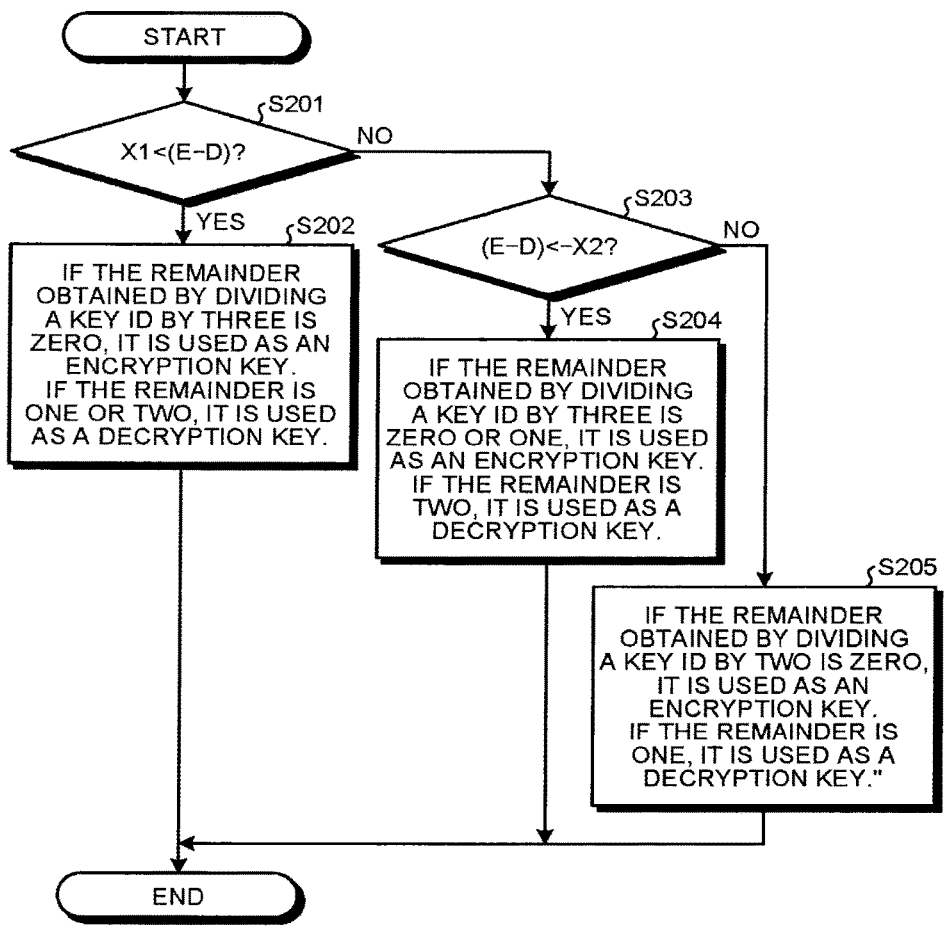
FIG. 8 is a flowchart illustrating an example of the description of a rule in the first embodiment.

An example of the description of the rule is illustrated in a flowchart of FIG. 8 and explained below. Note that E is the remaining number of keys associated as encryption keys, D is the remaining number of keys associated as decryption keys, X1 is a threshold value determining that the number of encryption keys is larger, and X2 is a threshold value determining that the number of decryption keys is larger.

When E is larger than D by X1 or more (step S201: Yes), the process proceeds to step S202. If the remainder obtained by dividing a key ID by three is zero, it is used as an encryption key. If the remainder is one or two, it is used as a decryption key (step S202). When E is not larger than D by X1 or more (step S201: No), the process proceeds to step S203.

When D is larger than E by X2 or more (step S203: Yes), the process proceeds to step S204. If the remainder obtained by dividing a key ID by three is zero or one, it is used as an encryption key. If the remainder is two, it is used as a decryption key (step S204). When D is not larger than E by X2 or more (step S203: No), the process proceeds to step S205. If the remainder obtained by dividing a key ID by two is zero, it is used as an encryption key. If the remainder is one, it is used as a decryption key (step S205).

In this rule, when the number of encryption keys is larger than the number of decryption keys by a certain value or more, the ratio between the keys associated as encryption keys and the keys associated as decryption keys is set to 1:2. When the number of decryption keys is larger than the number of encryption keys by a certain value or more, the ratio between the keys associated as encryption keys and the keys associated as decryption keys is set to 2:1. In none of the cases (i.e., the difference between the numbers of keys associated as encryption keys and keys associated as decryption keys is within a certain value), the ratio between the keys associated as encryption keys and the keys associated as decryption keys is set to 1:1.

By thus agreeing in advance on a rule in which the ratio between roles (an encryption key and a decryption key) with which keys are associated is changed according to the difference between the remaining numbers of associated keys, the synchronization processor 104 can deal with and correct shortages or imbalance between keys for each role without performing a key-consuming protocol process at all. Namely, even when one node 100 performs transmission of a large amount of data but does not perform reception much, i.e., transmits a large amount of data in one direction, key allocation can be efficiently performed.

Note that the rule described here is an example and thus the rule may be such that, for example, the ratio between roles (an encryption key and a decryption key) with which keys are associated is changed using the absolute values of the remaining numbers instead of the difference between the remaining numbers. Note also that although the rule is such that the ratio between roles with which keys are associated is changed in three ways, the rule may be such that the condition is branched in four or more ways. Note that the example of (C1) uses the variation (A1) with regard to key allocation timing. In addition, with regard to a key association method, the example of (C1) uses the variation (B1) or the variation (B2).

Next, the method (C2) will be described. Here, a given node 100 (called a master in accordance with Q3P) executes an auxiliary protocol (i.e., an exchange of control messages) with the other node 100 (i.e., a slave) based on a predetermined condition, by which shortages or imbalance between keys for each role occurring during the execution of the system is dealt with. The auxiliary protocol is implemented using the auxiliary protocol unit 105.

The predetermined condition may be, for example, as described in (C1), the case in which the absolute values of or the value of the difference between the remaining numbers of keys for each role exceed(s) a threshold value, or may be the case in which a certain number of keys are generated by the key generator 102, or may be the case in which a certain time has elapsed. An auxiliary protocol to be executed on these conditions has the following variations (C2-A), (C2-B), and (C2-C).

The following three ways are considered:
(C2-A) The master notifies the slave of an instruction to change a rule that determines roles associated with key IDs;
(C2-B) Some of the keys already associated as encryption keys are reassociated as decryption keys (Reversely, some of the keys associated as decryption keys may be reassociated as encryption keys); and
(C2-C) The keys associated as encryption keys are interchanged with the keys associated as decryption keys.

Figure 9:
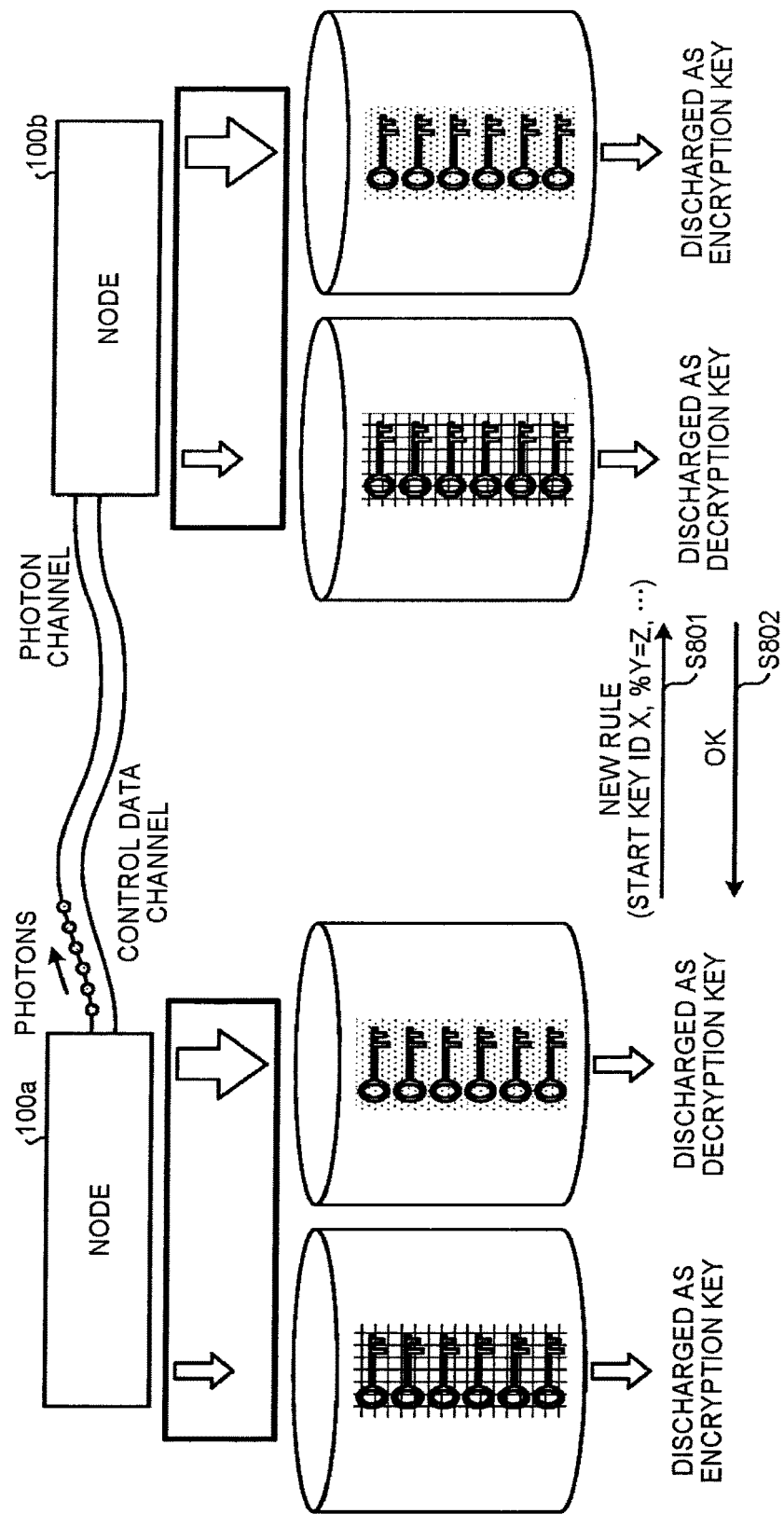
FIG. 9 is a diagram illustrating a specific example of key allocation.

Variation (C2-A) will be described. FIG. 9 is a diagram illustrating a specific example of key allocation for the case of (C2-A).

The master (node 100*a*) notifies the slave (node 100*b*) of a message including information indicating a new rule about associations between key IDs and roles and information about a key ID of the first key from which the new rule starts to apply, as an auxiliary protocol (step S801). The slave responds to the message (step S802). Thereafter, when associations are established for keys having key IDs after the notified key ID, the master and the slave establish the associations by referring to the notified new rule.

For the rule, for example, simple rules similar to those in the above-described example such as those explained below can be used.

A rule using the relationship between the even and odd numbers of key IDs

A rule in which the remainder obtained by dividing a key ID by a notified specific number is referred to, and according to the value of the remainder, one node 100 associates a key indicated by the key ID as an encryption key, and the other node 100 associates a key indicated by the key ID as a decryption key A rule in which one node 100 associates all keys as encryption keys, and the other node 100 associates all keys as decryption keys By thus operating simple rules while changing them by an instruction by an auxiliary protocol, shortages or imbalance between keys for each role can be dealt with and corrected.

Note that the example of (C2-A) uses the variation (A1) with regard to the above-described key allocation timing. In addition, with regard to the above-described key association method, the example of (C2-A) uses the variation (B1) or the variation (B2).

Figure 10:
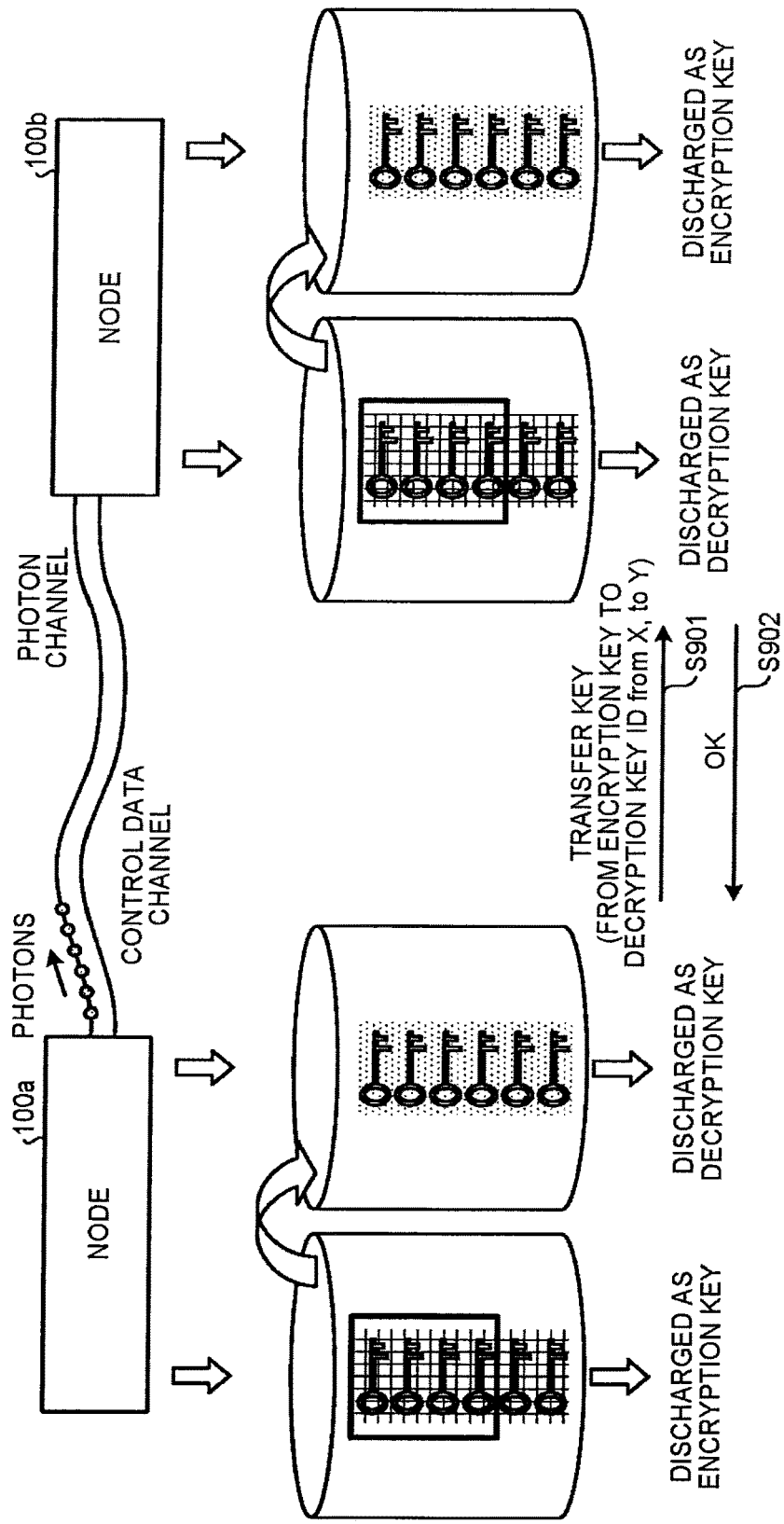
FIG. 10 is a diagram illustrating a specific example of key allocation.

Variation (C2-B) will be described. FIG. 10 is a diagram illustrating a specific example of key allocation for the case of (C2-B).

The master (node 100*a*) notifies the slave (node 100*b*) of a message including information indicating the range of keys already associated as a given role (i.e., a calculation formula indicating the start of a key ID and the end of a key ID, or key IDs) and information on a role with which the keys are newly associated (e.g., an encryption key, a decryption key, etc.), as an auxiliary protocol (step S901). The slave responds to the message (step S902).

By this, for example, when the master has an adequate number of encryption keys but is short on decryption keys, some of the encryption keys are reassociated as decryption keys. Likewise, as corresponding associations, the slave also reassociates some of the decryption keys as encryption keys. By this, the master makes up for a shortage of decryption keys and the slave makes up for a shortage of encryption keys. As a result, shortages or imbalance between keys for each role can be dealt with and corrected.

Note that the example of (C2-B) uses the variations (A1) and (A2) with regard to the above-described key allocation timing. Specifically, when the key generator 102 generates keys and stores the keys in the key storage 121 for the first time, associations are established (based on a certain rule such as that described in the method (C1)) (corresponding to the variation (A1)). In addition, using a storage protocol, associations for keys already stored in the key storage 121 are established again (corresponding to the variation (A2)). In addition, with regard to the above-described key association method, the example of (C2-B) uses the variation (B1) or the variation (B2).

Figure 11:
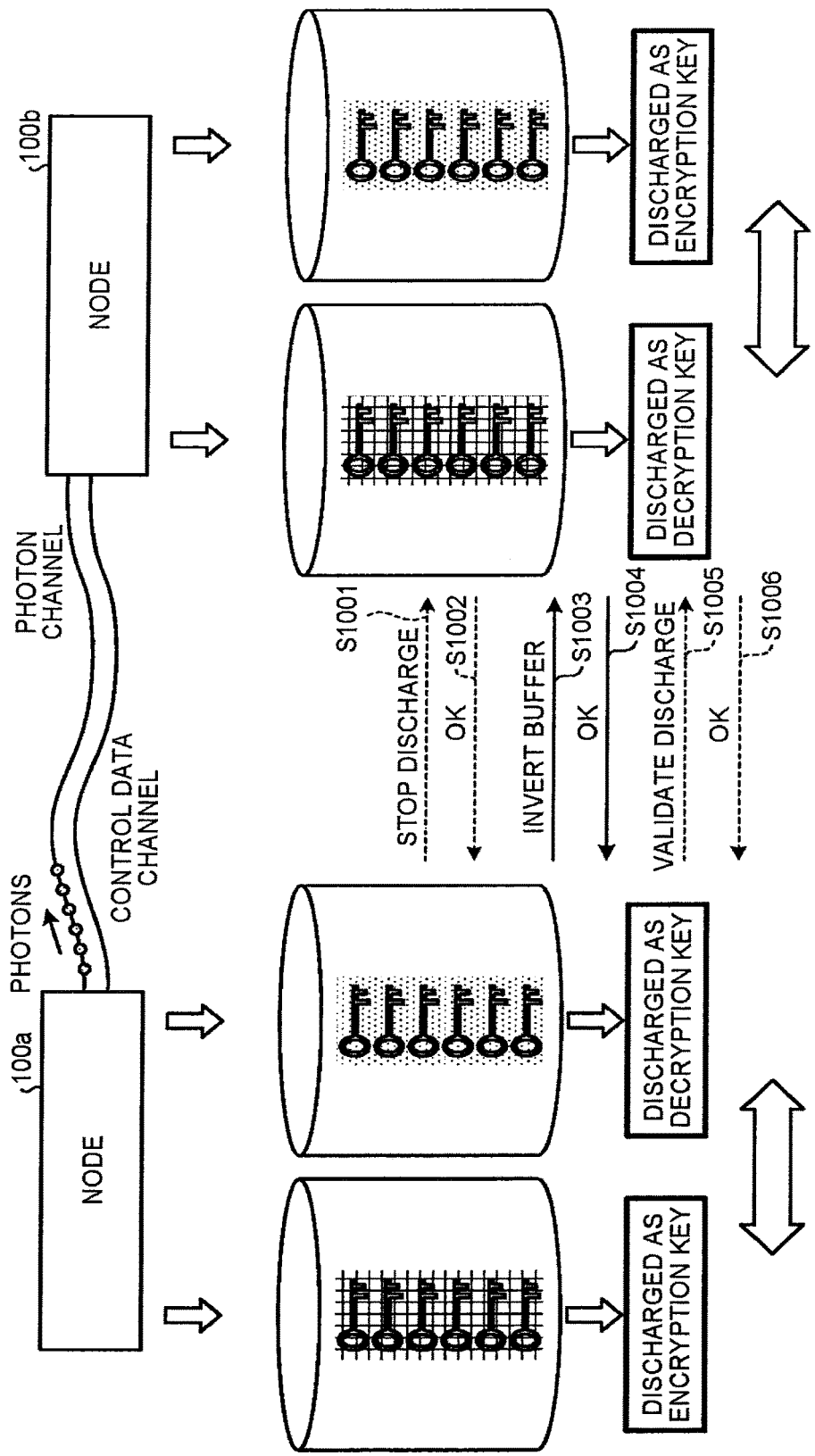
FIG. 11 is a diagram illustrating a specific example of key allocation.

Variation (C2-C) will be described. FIG. 11 is a diagram illustrating a specific example of key allocation for the case of (C2-C).

The master (node 100*a*) notifies the slave of a message including information (e.g., an encryption key and a decryption key) indicating roles whose associations are to be inverted, as an auxiliary protocol (step S1003). The slave responds to the message (step S1004). By this, the keys associated with an adequate role in the master and the slave are associated with a deficient (inadequate) role. Reversely, the keys associated with a deficient role are associated with an adequate (not much required) role. As a result, shortages or imbalance between keys for each role can be dealt with and corrected.

Note that the example of (C2-C) uses the variations (A1) and (A2) with regard to the above-described key allocation timing. Specifically, when the key generator 102 generates keys and stores the keys in the key storage 121 for the first time, associations are established (based on a certain rule such as that described in the method (C1)) (corresponding to the variation (A1)). In addition, using a storage protocol, associations for keys already stored in the key storage 121 are established again (corresponding to the variation (A2)). In addition, with regard to the above-described key association method, the example of (C2-C) uses the variation (B1) or the variation (B2).

Note that when all of the key associations are changed by (C2-C), or depending on how to specify key IDs whose associations are to be changed in (C2-B), the timing at which the key using unit 106 uses a key for encrypted data communication and the timing at which key associations are changed may differ between one node 100 and the other node 100, and thus, the results of key allocation may differ between the nodes 100.

To avoid such a situation, in (C2-C) or (C2-B), a discharge of keys from the key storage 121 (i.e., provision of keys to the key using unit 106 or the key generator 102) may be stopped before or after the execution of an auxiliary protocol. FIG. 11 also illustrates the procedure of performing a sequence for stopping a key discharge (step S1001 and step S1002) before executing an auxiliary protocol, and performing a sequence for validating a key discharge (allowing a discharge) after executing the auxiliary protocol (step S1005 and step S1006).

In this manner, key allocation of encryption keys and decryption keys can be performed between the transmitting node and the receiving node with less processing load and less wasted key consumption. Note that the formats of an auxiliary protocol and a protocol that controls the validation and stop of a key discharge which are described above are not particularly limited. Hence, the same protocol formats as those used for the LOAD protocol and the STORE protocol used in Q3P may be used or other protocol formats may be used.

Note that in addition to the method in which key allocation of encryption keys and decryption keys are performed in the above-described manner, a method is also possible in which time slots during which keys can be used are determined in advance for each node 100. Specifically, timing (time slot) at which one node 100 can use keys as encryption keys is determined. During the time slot, the node 100 uses keys present in the Common Store as encryption keys, and the other node 100 uses the keys as decryption keys. Then, during the next time slot, the other node 100 uses the keys as encryption keys and the one node 100 uses the keys as decryption keys. By performing control in this manner, too, the synchronization processor 104 can perform high-speed key allocation without performing a complex protocol process, e.g., Q3P, and furthermore, without additional key consumption for the execution of a protocol.

Figure 12:
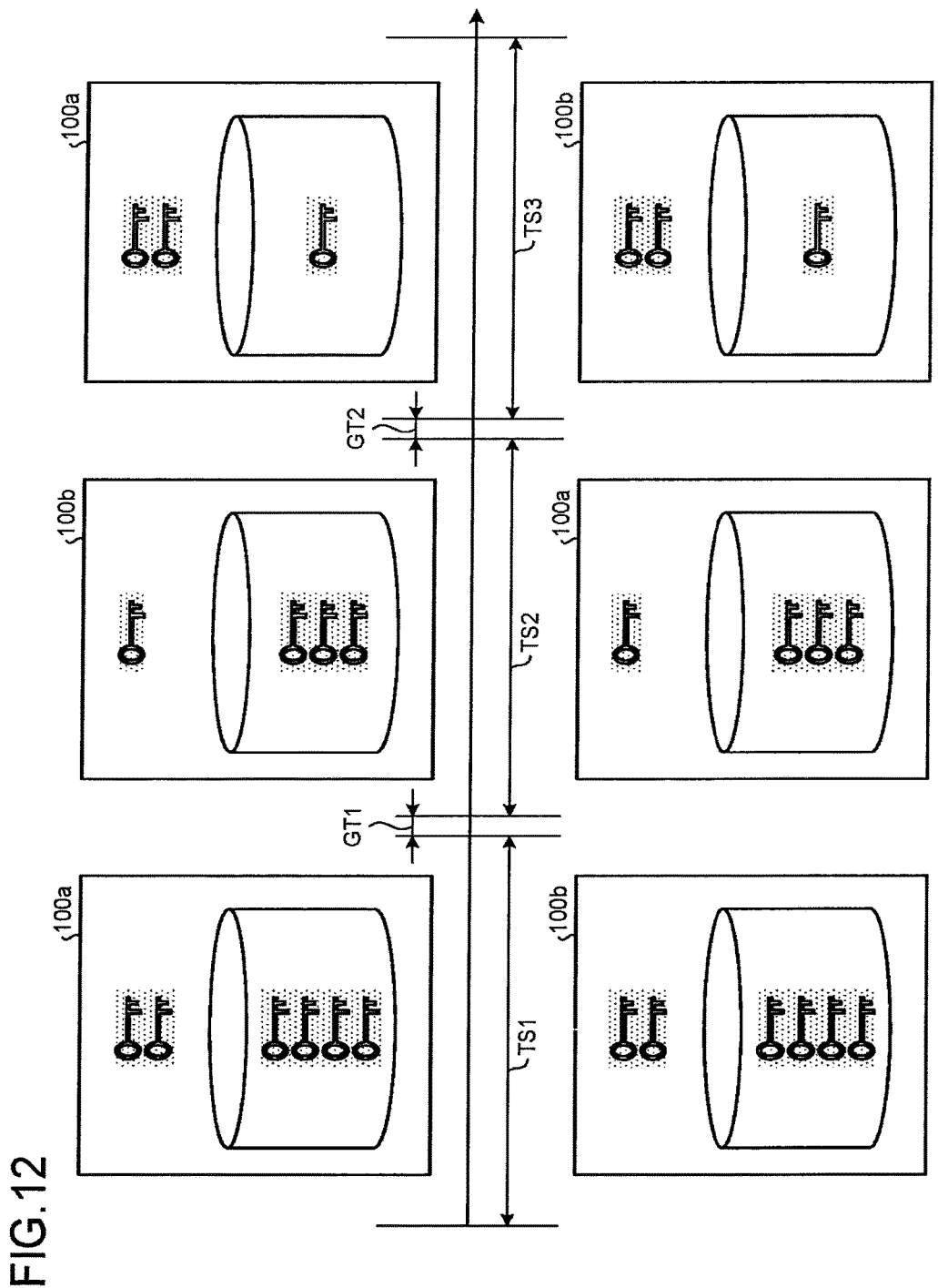
FIG. 12 is a diagram describing a specific example of a method of determining time slots.

FIG. 12 is a diagram describing a specific example of a method of determining time slots. TS1 and TS3 indicate time slots during which the node 100a (transmitting node) uses keys as encryption keys and the node 100b (receiving node) uses the keys as decryption keys. TS2 indicates a time slot during which the node 100b uses the keys as encryption keys and the node 100a uses the keys as decryption keys.

In this method using time slots, too, shortages or imbalance between keys for each role may occur during the execution of the system. In such a case, by adjusting the duration of time slots provided to the nodes 100 by, for example, the above-described method (C1), the shortages or imbalance can be dealt with.

Note, however, that with the method described here, the application cannot use encryption keys and decryption keys at arbitrary timing. Due to this, there is a possibility that performing of transmission and reception of encrypted data by the application may be delayed. In addition, to safely operate the system, guard times (GT1 and GT2 in FIG. 12) need to be provided in addition to available time slots.

Second Embodiment

A second embodiment describes key allocation for the case of including a plurality of quantum key distribution apparatuses. In the following, a description is made assuming that a quantum communication unit corresponds to a quantum key distribution apparatus. Note that, for example, even if it is interpreted that the whole node of the first embodiment corresponds to a quantum key distribution apparatus, the same functions as those explained below can be implemented. In the second embodiment, too, as in the first embodiment, execution of a protocol for key allocation is eliminated, and thus, the processing load required for key allocation and wasted key consumption can be suppressed.

Figure 13:
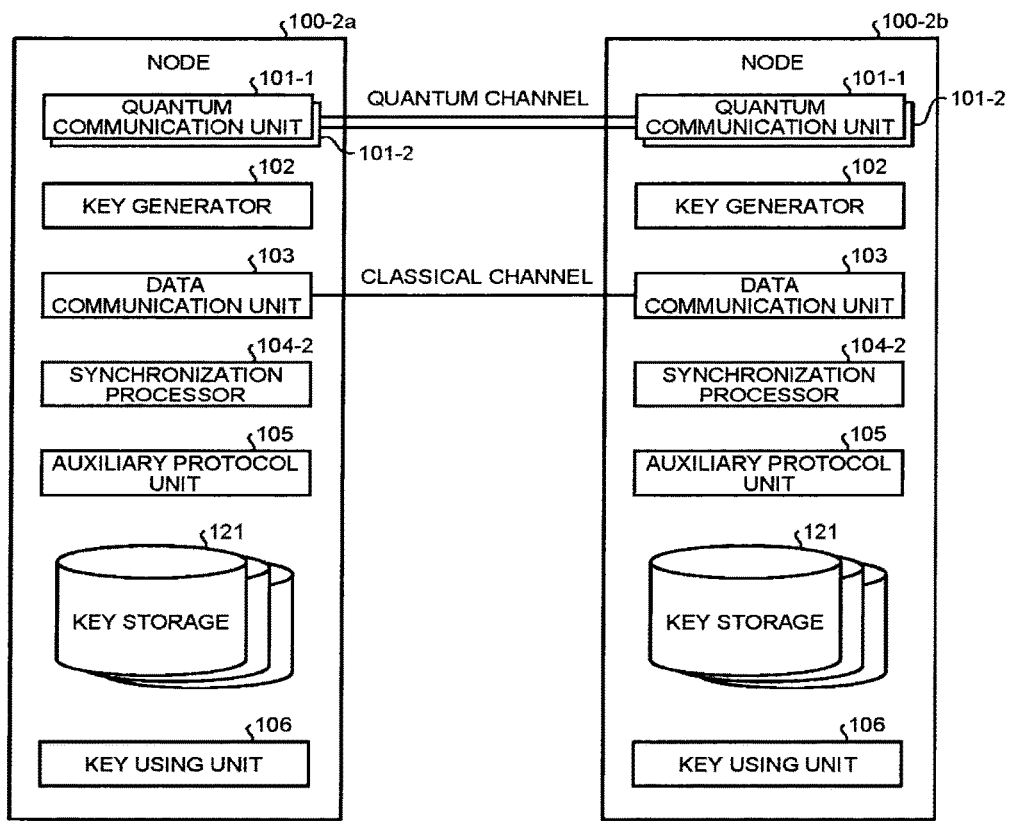
FIG. 13 is a block diagram of a quantum key distribution system of a second embodiment.

FIG. 13 is a block diagram illustrating an exemplary configuration of a quantum key distribution system of the second embodiment. Each node 100-2 (100-2a, 100-2b) of the second embodiment includes quantum communication units 101-1 and 101-2, a key generator 102, a data communication unit 103, a synchronization processor 104-2, an auxiliary protocol unit 105, a key storage 121, and a key using unit 106. The second embodiment differs from the first embodiment in the following points. Other configurations are the same as those of the first embodiment and thus are denoted by the same reference signs and a description thereof is omitted.

The first difference is that each node 100-2 has a plurality of quantum communication units (quantum communication units 101-1 and 101-2). By such a configuration, a plurality of quantum key distributions can be performed in parallel. As a result, comparing to the first embodiment, a large number of keys can be shared at a higher speed. In addition, though not illustrated here, at this time, in order to efficiently generate keys from the results of single photon communication performed by each of the quantum communication units (quantum communication units 101-1 and 101-2), at least one of the key generator 102, the data communication unit 103, and an accompanying quantum channel and classical channel may be provided in plural number. Note that although FIG. 13 illustrates an example in which two quantum communication units 101-1 and 101-2 are provided, three or more quantum communication units may be provided.

The second difference is that the functions of the synchronization processor 104-2 are changed. The synchronization processor 104-2 has, in addition to the function of key synchronization (key allocation) of an encryption key and a decryption key such as that described in the first embodiment, the function of key synchronization (key integration) of a plurality of QKD links. The latter will be described below.

Variations of a key allocation method and an integration method performed by the synchronization processor 104-2 for key synchronization (key integration) of a plurality of QKD links are explained. The methods are broadly classified into two methods.

The first method is a method (integration-allocation technique) in which, as with Q3P, keys generated by a plurality of quantum key distributions are integrated into one first and then allocated as encryption keys and decryption keys. This method is the same as that described in FIG. 4.

The second method is a method (allocation-integration technique) in which, unlike Q3P, keys generated by each quantum key distribution are allocated as encryption keys and decryption keys first, and then, the encryption keys associated by the plurality of quantum key distributions are integrated into one and the decryption keys associated by the plurality of quantum key distributions are integrated into one. This method will be described in FIG. 14 which will be described later.

First, the first method (integration-allocation technique) will be described using FIGS. 4 and 13.

A key storage area that stores keys shared by a single quantum key distribution is called a Pickup Store in accordance with Q3P. The key storage 121 has a plurality of Pickup Stores. Keys stored in the plurality of Pickup Stores are stored in a single key storage area (Common Store) present in a node 100-2. Thereafter, the procedure of allocating the keys stored in the Common Store as encryption keys and decryption keys is performed. The procedure of allocating the keys stored in the Common Store as encryption keys and decryption keys is as described in the first embodiment (key synchronization (key allocation) of an encryption key and a decryption key). Here, a method of transferring the keys in the Pickup Stores to the Common Store (key synchronization (key integration) of a plurality of QKD links) will be described.

As such a method, a method can be applied in which the node 100-2 determines in advance a rule that determines from which key stored in which Pickup Store is to be transferred to the Common Store in turn (a rule that determines the order of using keys).

For example, it is assumed that there are two Pickup Stores (a store P1 and a store P2) (two pairs of quantum key distributions are operated). At this time, a rule can be applied in which the procedure of transferring the first key which is the first one stored in the store P1 to the Common Store, and then transferring the first key stored in the store P2 to the Common Store, and then transferring the second key stored in the store P1 to the Common Store is repeated.

The numbers of keys transferred from the stores P1 and P2 do not need to be equal to each other. For example, a rule is also possible in which two keys are transferred from the store P1 and then one key is transferred from the store P2. As an extreme case, a rule is also possible in which only the keys from the store P1 are always transferred to the Common Store and the keys in the store P2 are not transferred to the Common Store.

The ratio between the numbers of keys transferred from the Pickup Stores may be determined using a ratio in which the average values of key generation speeds of respective quantum key distributions are reflected. As such, by determining in advance the key selection and transfer rules, the synchronization processor 104-2 can perform high-speed key integration without performing a complex protocol process, e.g., Q3P, and furthermore, without additional key consumption for the execution of a protocol.

Meanwhile, it is generally considered that with such a simple key integration rule it is difficult to deal with a reduction (drop) or a change in the numbers of keys generated in the quantum key distribution apparatuses which occurs during the execution of the system. Note, however, that here it is considered that the environment where the quantum key distribution apparatus is installed, the channel through which an optical fiber passes, and the like, do not differ almost at all between the quantum key distribution apparatuses. Hence, it is considered that even with a simple rule such as that described above, in many cases operation is performed without any problem.

However, there is a possibility that a reduction (drop) or a change in the number of keys generated may actually occur at different ratios in different quantum key distribution apparatuses. For example, it is assumed that a "rule" in which keys are transferred in turn from the store P1 and the store P2 is adopted. There is no problem when both channels are stable or the numbers of keys generated change in the same manner, but it is assumed that the key generation speed is reduced in one quantum key distribution apparatus. Such a case invites a situation where one Pickup Store has adequate keys but the other Pickup Store is empty, and thus, keys cannot be transferred to the Common Store.

As a method of overcoming this problem, there are the following methods (D1) and (D2).

(D1) A method in which the key storage 121 adopts a complicated rule in which taking into account the remaining numbers of keys for each Pickup Store, a change is made (D2) A method in which control is performed such that, when a predetermined condition is satisfied, an auxiliary protocol is executed to resolve an imbalance between the remaining numbers of keys for each Pickup Store The method (D1) is a method similar to the content described in (C1) in the first embodiment. Specifically, for example, when the difference between the remaining number of keys in the store P1 and the remaining number of keys in the store 22 exceeds a given threshold value agreed in advance, the ratio between keys transferred from the store P1 and the store P2 is changed to change such that the number of keys transferred from a Pickup Store with a smaller remaining number of keys is reduced.

Next, the method (D2) will be described. This is a method similar to the content described in (C2) in the first embodiment. For example, (D2) is a method corresponding to (C2-A) described in the first embodiment, i.e., a method in which a master notifies a slave of an instruction to change a rule about the order of selecting keys to be transferred from the Pickup Stores to the Common Store.

By the above, integration of keys generated by a plurality of quantum key distribution apparatuses can be performed with less processing load and less wasted key consumption.

Figure 14:
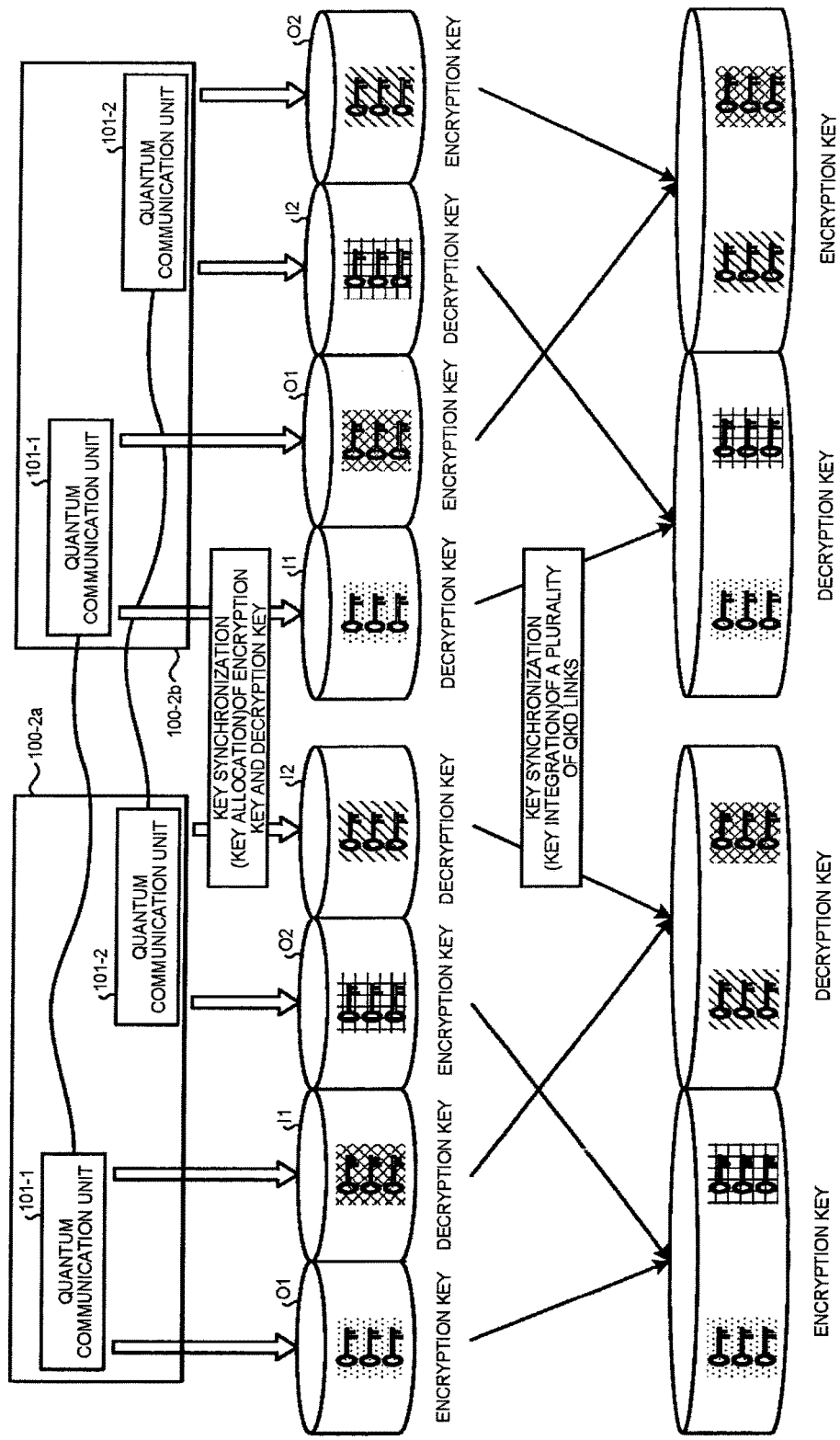
FIG. 14 is a diagram for describing an allocation-integration technique.

Next, the (allocation-integration technique) which is another method will be described. FIG. 14 is a diagram for describing the allocation-integration technique.

When two pairs of quantum key distributions are performed, a node 100-2 has two Out-Buffers (a buffer O1 and a buffer O2). The buffers O1 and O2 are respectively Out-Buffers originating from stores P1 and P2. Likewise, the node 100-2 has two In-Buffers (a buffer I1 and a buffer I2). The buffers I1 and I2 are respectively In-Buffers originating from the stores P1 and P2.

When transmission of encrypted data is performed, keys in the buffer O1 and the buffer O2 are used according to a "rule determined in advance" between the nodes 100-2. When reception of encrypted data is performed, keys in the buffer and the buffer I2 are used according to a "rule determined in advance" between the nodes 100-2. For example, as illustrated in FIG. 14, upon transmission, the keys in the buffer O1 and the buffer O2 are used as encryption keys, and upon reception, the keys in the buffer I1 and the buffer I2 are used as decryption keys.

For determination of these rules, the same integration method as that described in the integration-allocation technique can be used. Note that by thus determining the order of using the In-Buffers and the Out-Buffers, a buffer for integration does not need to be provided, and keys are used or consumed in turn from the plurality of In-Buffers and Out-Buffers, based on "rules determined in advance".

Furthermore, for the rules, not only a rule based on the number of keys used, but also a rule based on a time slot during which keys are used can be used. Specifically, timing (time slot) at which keys obtained based on a given quantum key distribution can be used is determined, and during that time slot, the keys are used from corresponding buffers (e.g., the buffer I1 and the buffer O1). Then, during the next time slot, keys obtained based on another quantum key distribution are used (from other buffers, e.g., the buffer I2 and the buffer O2).

By performing control in this manner, too, the synchronization processor 104-2 can use keys in a unified manner without performing a complex protocol process, e.g., Q3P.

Figure 15:
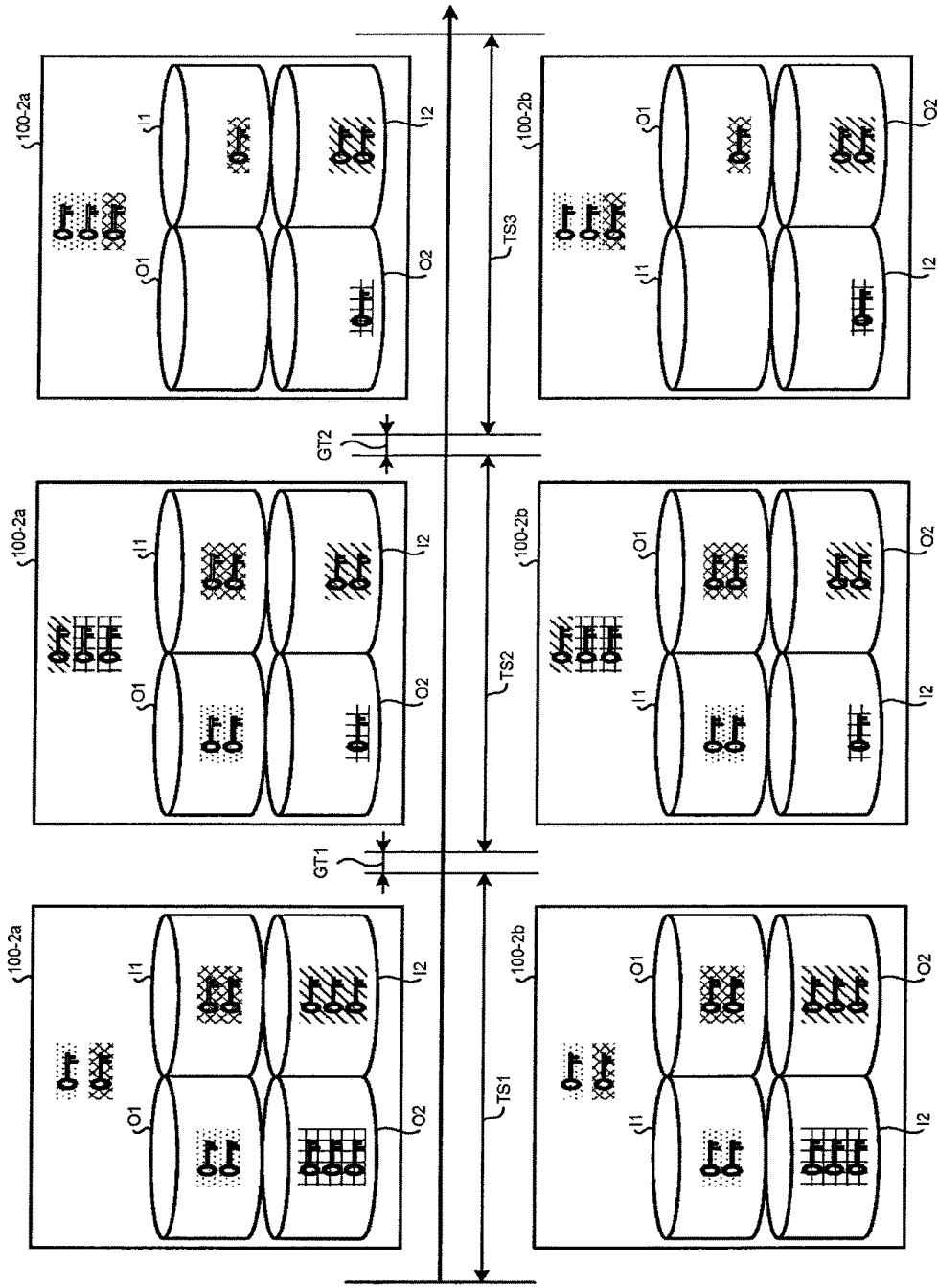
FIG. 15 is a diagram describing a specific example of a method of determining time slots.

FIG. 15 is a diagram describing a specific example of a method of determining time slots. TS1 and TS3 indicate time slots during which keys in the buffer O1 and the buffer I1 are used. TS2 indicates a time slot during which keys in the buffer O2 and the buffer I2 are used.

In addition, in this technique using time slots, too, shortages or imbalance between keys for each buffer may occur during the execution of the system. In such a case, as with the above-described (C1) and (D1), the duration of time slots provided to the nodes 100-2 may be adjusted by the "method in which the key storage 121 adopts a complicated rule in which taking into account the remaining numbers of keys for each buffer, a change is made". Note, however, that to safely operate the system, guard times (GT1 and GT2 in FIG. 15) need to be provided in addition to available time slots.

For the method of implementing the allocation-integration technique, a method such as that explained below is also possible. As a network interface, a virtual interface (interface) which is independent of a physical network interface is provided. Control is performed such that when data is transmitted through the virtual interface, the data is encrypted using a key and then transmitted, and furthermore, when data is received through the virtual interface, the data is decrypted using a key and then received.

For example, an IF 1 is provided which is a virtual network interface designed to perform encrypted data transmission using the buffer O1 and encrypted data reception using the buffer I1 (i.e., a virtual network interface that performs encrypted data transmission and reception which are implemented using keys stored in the store P1).

At the same time, an IF 2 is provided which is a virtual network interface designed to perform encrypted data transmission using the buffer O2 and encrypted data reception using the buffer I2 (i.e., a virtual network interface that performs encrypted data transmission and reception which are implemented using keys stored in the store P1).

By configuring such that the two virtual interfaces are used based on a given "rule determined in advance", the allocation-integration technique can be implemented. The above-described algorithm can be used for the "rule determined in advance".

Note that a method of implementing this scheme can be implemented using various existing technologies for network multiplexing where a plurality of network interfaces are used based on a rule determined in advance. For example, the key integration described here can also be implemented by design that introduces another virtual network interface (integrated encryption interface) that combines the above-described two virtual network interfaces together by IEEE 802.3ad Link Aggregation (also called "bonding" or "teaming").

Figure 16:
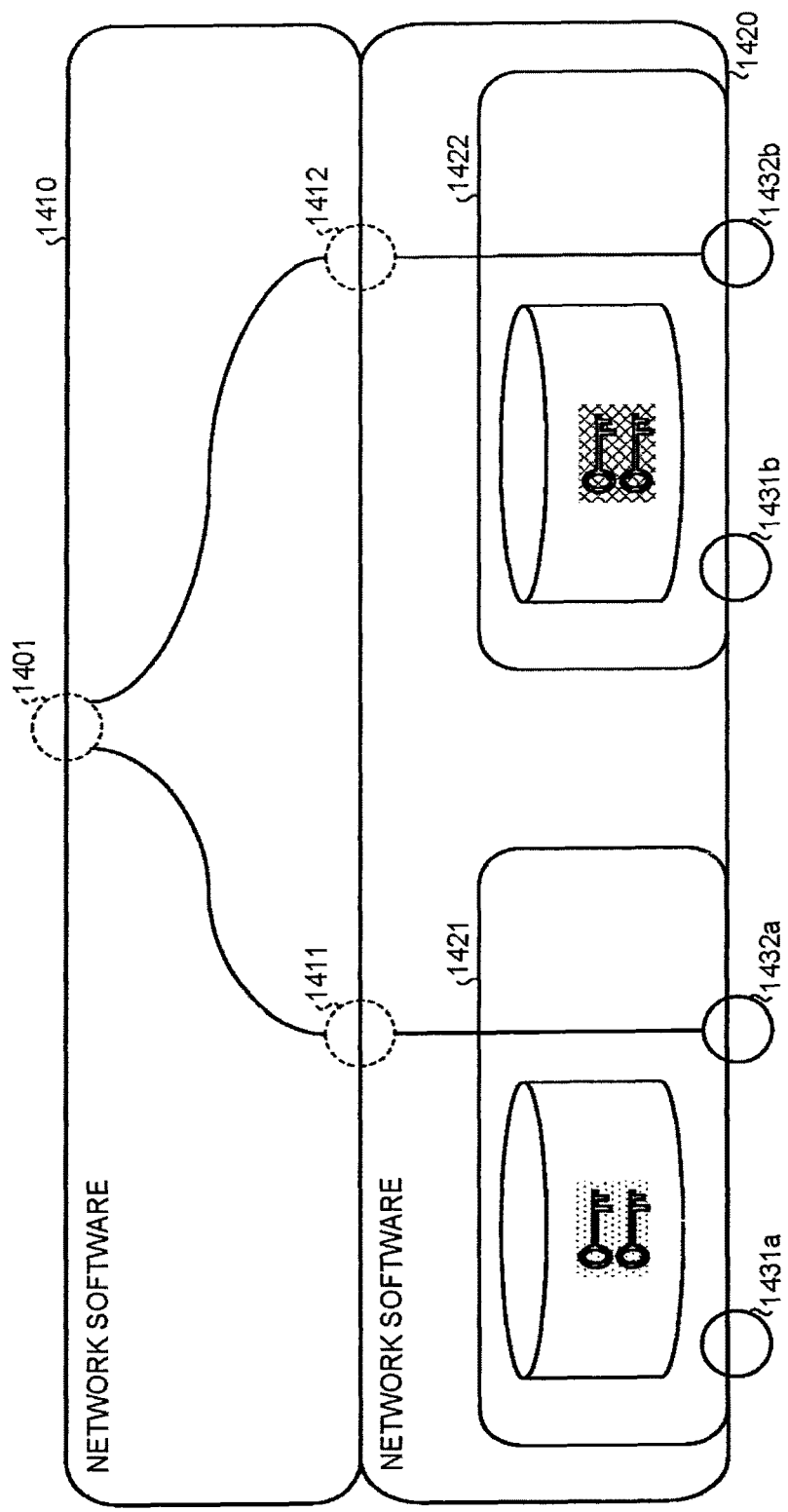
FIG. 16 is a diagram illustrating an example of network interface design.

FIG. 16 is a diagram illustrating an example of network interface design for the case of using an integrated encryption interface. An IF 1401 indicates an integrated encryption interface. An IF 1411 and an IF 1412 indicate virtual network interfaces to be integrated. They are provided in network software 1410 which is, for example, a driver.

Network software 1420 has functions 1421 and 1422 corresponding to the above-described quantum communication units 101-1 and 101-2, key generator 102, data communication unit 103, and the like. An IF 1431a and an IF 1431b are physical interfaces corresponding to interfaces used by the above-described quantum communication unit 101-1. An IF 1432a and an IF 1432b are physical interfaces corresponding to interfaces used by the above-described data communication unit 103.

For example, when data is transmitted from the IF 1411 through the IF 1432a, the data is encrypted with a key in the buffer O1 and transmitted. When data is received through the IF 1432a, the data is decrypted with a key in the buffer I1. Likewise, for example, when data is transmitted from the IF 1412 through the IF 1432b, the data is encrypted with a key in the buffer O2. When data is received through the IF 1432b, the data is decrypted with a key in the buffer I2.

For the method of implementing the allocation-integration technique, a method such as that explained below is also possible. When there are two pairs of quantum key distribution apparatuses, one pair is dedicated to an Out-Buffer of a transmitting node, i.e., dedicated to an In-Buffer of a receiving node, and the other pair is dedicated to an In-Buffer of the transmitting node, i.e., dedicated to an Out-Buffer of the receiving node. This is a method that does not require either key allocation or key integration.

When there are three or more pairs of quantum key distribution apparatuses, a method is possible in which two pairs are provided to be dedicated to Out-Buffers of a transmitting node, i.e., dedicated to In-Buffers of a receiving node, and one pair is provided to be dedicated to an In-Buffer of the transmitting node, i.e., dedicated to an Out-Buffer of the receiving node. The number of pairs of apparatuses assigned to be dedicated to the Out-Buffer of the transmitting node, i.e., dedicated to the In-Buffer of the receiving node, and the number of pairs of apparatuses assigned to be dedicated to the In-Buffer of the transmitting node, i.e., dedicated to the Out-Buffer of the receiving node, are determined by an auxiliary protocol, by which shortages or imbalance between keys can be dealt with and also corrected.

As described above, according to the first and second embodiments, an efficiently operating key allocation method with less processing load and less wasted key consumption which is suitable for a high-speed quantum key distribution system can be implemented.

Figure 17:
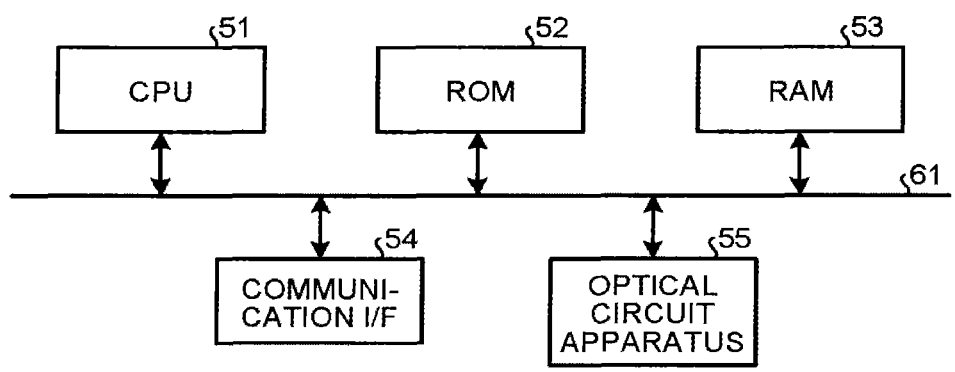
FIG. 17 is a hardware configuration diagram of a communication apparatus according to the embodiments.

Next, a hardware configuration of a communication apparatus according to the first or second embodiment will be described using FIG. 17. FIG. 17 is an illustrative diagram illustrating a hardware configuration of a communication apparatus according to the first or second embodiment.

A communication apparatus according to the first or second embodiment includes a control apparatus such as a CPU (Central Processing Unit) 51, storage devices such as a ROM (Read Only Memory) 52 and a RAM (Random Access Memory) 53, a communication I/F 54 that performs communication by connecting to a network, an optical circuit apparatus 55 that performs quantum key distribution, and a bus 61 that connects the components.

A program executed by the communication apparatus according to the first or second embodiment is preinstalled in the ROM 52, etc., and provided.

The configuration may be such that the program executed by the communication apparatus according to the first or second embodiment is provided as a computer program product by being recorded as a file in installable format or executable format in a computer-readable recording medium such as a CD-ROM (Compact Disk Read Only Memory), a flexible disk (FD), a CD-R (Compact Disk Recordable), or a DVD (Digital Versatile Disk).

Furthermore, the configuration may be such that the program executed by the communication apparatus according to the first or second embodiment is provided such that the program is stored in a computer connected to a network such as the Internet and downloaded via the network. Alternatively, the configuration may be such that the program executed by the communication apparatus according to the first or second embodiment is provided or distributed via a network such as the Internet.

The program executed by the communication apparatus according to the first or second embodiment can cause a computer to function as the above-described components of the communication apparatus. The computer can function as the components by reading a program by the CPU 51 from a computer-readable storage medium into a main storage device.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising a plurality of communication apparatuses, wherein each of the communication apparatuses includes:
a memory; and
one or more processors configured to:
generate shared keys shared with another communication apparatus;
synchronize at least one of order of using the generated shared keys and roles played when the generated shared keys are used, with another communication apparatus, based on a rule determined in advance, wherein
the one or more processors allocates the generated shared keys as one of an encryption key and a decryption key, based on the rule determined in advance such that a shared key allocated as an encryption key in another communication apparatus is allocated as a decryption key, and a shared key allocated as a decryption key in another communication apparatus is allocated as an encryption key, and
after allocating the generated shared keys based on the rule determined in advance:
when at least one predetermined conditions are satisfied, the one or more processors reallocates the shared keys, which have been allocated as encryption keys, as decryption keys or reallocates the shared keys, which have been allocated as decryption keys, as encryption keys, or
when at least one predetermined conditions are satisfied, the one or more processors interchanges the shared keys allocated as encryption keys with the shared keys allocated as decryption keys,
the predetermined conditions include at least one of a condition indicating whether an absolute value of a remaining number of shared keys exceeds a threshold value, a condition indicating whether a predetermined number of shared keys are generated, and a condition indicating whether a predetermined time is elapsed; and
stop use of the shared keys before a process of reallocating the shared keys and allow use of the shared keys after the process of reallocating the shared keys.

2. The system according to claim 1, wherein
the one or more processors stops use of the shared keys before a process of interchanging the shared keys with each other and allows use of the shared keys after the process of interchanging the shared keys with each other.

3. The system according to claim 1, wherein
each of the communication apparatuses further includes a plurality of quantum communication processors to perform quantum key distribution with another communication apparatus,
the one or more processors generates a plurality of shared keys for each of the plurality of quantum communication processors, and
the one or more processors synchronizes order of using the plurality of generated shared keys with another communication apparatus based on the rule that determines order of using the plurality of shared keys.

4. The system according to claim 1, wherein
each of the communication apparatuses further includes a plurality of quantum communication processors to perform quantum key distribution with another communication apparatus,
the one or more processors generates a plurality of shared keys for each of the plurality of quantum communication processors, and
the one or more processors allocates the plurality of generated shared keys as one of an encryption key and a decryption key, based on the rule determined in advance such that a shared key allocated as an encryption key in another communication apparatus is allocated as a decryption key, and a shared key allocated as a decryption key in another communication apparatus is allocated as an encryption key.

5. The system according to claim 1, wherein
each of the communication apparatuses further includes a plurality of quantum communication processors to perform quantum key distribution with another communication apparatus,
the one or more processors generates a plurality of shared keys for each of the plurality of quantum communication processors,
each of the communication apparatuses further includes a plurality of interfaces that respectively correspond to the plurality of shared keys, and perform encrypted data transmission and reception using their respective corresponding shared keys, and
the one or more processors synchronizes the interfaces to perform encrypted data transmission and reception using the plurality of generated shared keys with another communication apparatus based on the rule that determines which one of the plurality of interfaces is to be used.

6. The system according to claim 1, wherein
the rule is a rule that changes at least one of the order and the roles, according to times at which the shared keys are generated.

7. The system according to claim 1, wherein
the rule is a rule that changes at least one of the order and the roles, according to identification information identifying the shared keys.

8. The system according to claim 1, wherein
the rule is a rule that determines a period during which at least one of the order and the roles is to be changed.

9. The system according to claim 1, wherein,
when the at least one predetermined conditions are satisfied, the one or more processors changes the rule and synchronizes at least one of the order and the roles with another communication apparatus based on the changed rule.

10. The system according to claim 1, wherein
the one or more processors generates the shared keys based on quantum key distribution.

11. A communication method performed by a communication system including a plurality of communication apparatuses, the method comprising:
generating, by each of the communication apparatuses, shared keys shared with another communication apparatus;
synchronizing, by each of the communication apparatuses, at least one of order of using the generated shared keys and roles played when the generated shared keys are used, with another communication apparatus, based on a rule determined in advance, the synchronizing including allocating the generated shared keys as one of an encryption key and a decryption key, based on the rule determined in advance such that a shared key allocated as an encryption key in another communication apparatus is allocated as a decryption key, and a shared key allocated as a decryption key in another communication apparatus is allocated as an encryption key, and after allocating the generated shared keys based on the rule determined in advance:

when at least one predetermined conditions are satisfied, the synchronizing including reallocating the shared keys, which have been allocated as encryption keys, as decryption keys or reallocating the shared keys, which have been allocated as decryption keys, as encryption keys, or when at least one predetermined conditions are satisfied, the synchronizing including interchanging the shared keys allocated as encryption keys with the shared keys allocated as decryption keys, the predetermined conditions including at least one of a condition indicating whether an absolute value of a remaining number of shared keys exceeds a threshold value, a condition indicating whether a predetermined number of shared keys are generated, and a condition indicating whether a predetermined time is elapsed; and stopping use of the shared keys before a process of reallocating the shared keys and allowing use of the shared keys after the process of reallocating the shared keys.

12. A communication apparatus comprising:

a memory; and one or more processors configured to:

generate shared keys shared with an external apparatus;

synchronize at least one of order of using the generated shared keys and roles played when the generated shared keys are used, with the external apparatus, based on a rule determined in advance, wherein the one or more processors allocates the generated shared keys as one of an encryption key and a decryption key, based on the rule determined in advance such that a shared key allocated as an encryption key in the external apparatus is allocated as a decryption key, and a shared key allocated as a decryption key in the external apparatus is allocated as an encryption key, and after allocating the generated shared keys based on the rule determined in advance:

when at least one predetermined conditions are satisfied, the one or more processors reallocates the shared keys, which have been allocated as encryption keys, as decryption keys or reallocates the shared keys, which have been allocated as decryption keys, as encryption keys, or when at least one predetermined conditions are satisfied, the one or more processors interchanges the shared keys allocated as encryption keys with the shared keys allocated as decryption keys, the predetermined conditions include at least one of a condition indicating whether an absolute value of a remaining number of shared keys exceeds a threshold value, a condition indicating whether a predetermined number of shared keys are generated, and a condition indicating whether a predetermined time is elapsed; and stop use of the shared keys before a process of reallocating the shared keys and allow use of the shared keys after the process of reallocating the shared keys.

13. A non-transitory computer-readable recording medium including programmed instructions, wherein the instructions, when executed by a computer comprising one or more processors, cause the computer to:

generate shared keys shared with an external apparatus;

synchronize at least one of order of using the generated shared keys and roles played when the generated shared keys are used, between the computer and the external apparatus, based on a rule determined in advance, the synchronization allocating the generated shared keys as one of an encryption key and a decryption key, based on the rule determined in advance such that a shared key allocated as an encryption key in the external apparatus is allocated as a decryption key, and a shared key allocated as a decryption key in the external apparatus is allocated as an encryption key, and after allocating the generated shared keys based on the rule determined in advance:

when at least one predetermined conditions are satisfied, the synchronization reallocating the shared keys, which have been allocated as encryption keys, as decryption keys or reallocating the shared keys, which have been allocated as decryption keys, as encryption keys, or when at least one predetermined conditions are satisfied, the synchronization interchanging the shared keys allocated as encryption keys with the shared keys allocated as decryption keys, the predetermined conditions including at least one of a condition indicating whether an absolute value of a remaining number of shared keys exceeds a threshold value, a condition indicating whether a predetermined number of shared keys are generated, and a condition indicating whether a predetermined time is elapsed; and stop use of the shared keys before a process of reallocating the shared keys and allow use of the shared keys after the process of reallocating the shared keys.

* * * * *